US012695341B2

(12) United States Patent (10) Patent No.: US 12,695,341 B2
Zhao et al. (45) Date of Patent: Jul. 28, 2026

(54) RADIAL FLUX MOTOR, POWERTRAIN, AND VEHICLE

(71) Applicant: Huawei Digital Power Technologies Co., Ltd., Futian District (CN)

(72) Inventors: Xinying Zhao, Xi'an (CN); Mengxuan Lin, Dongguan (CN); Zhao Zhou, Shenzhen (CN)

(73) Assignee: Huawei Digital Power Technologies Co., Ltd., Shenzhen (CN)

( * ) Notice: Subject to any disclaimer, the term of this patent is extended or adjusted under 35 U.S.C. 154(b) by 321 days.

(21) Appl. No.: 18/394,483

(22) Filed: Dec. 22, 2023

(65) Prior Publication Data

US 2024/0223033 A1 Jul. 4, 2024

(30) Foreign Application Priority Data

Dec. 30, 2022 (CN) .......................... 202223613482.7

(51) Int. Cl.
  H02K 1/27 (2022.01)
  H02K 1/276 (2022.01)
  H02K 7/00 (2006.01)
(52) U.S. Cl.
  CPC ............. H02K 1/276 (2013.01); H02K 7/006 (2013.01); H02K 2213/03 (2013.01)
(58) Field of Classification Search
  CPC ........ H02K 1/27; H02K 1/2766; H02K 7/006; H02K 2213/03
  USPC ...................................................... 310/156.53
  See application file for complete search history.

(56) References Cited

U.S. PATENT DOCUMENTS

| | | | | |
|---|---|---|---|---|
| 6,340,857 B2 * | 1/2002 | Nishiyama | ............. | H02K 7/006 |
| | | | | 310/156.41 |
| 6,741,002 B2 * | 5/2004 | Nishiyama | ............. | H02K 7/006 |
| | | | | 310/156.41 |
| 6,917,133 B2 * | 7/2005 | Koharagi | ............... | H02K 21/16 |
| | | | | 310/156.56 |
| 7,385,328 B2 * | 6/2008 | Melfi | ..................... | H02K 29/03 |
| | | | | 310/156.53 |
| 7,559,996 B2 | 7/2009 | Miyata et al. | | |
| 7,605,510 B2 * | 10/2009 | Okuma | ................ | H02K 1/2766 |
| | | | | 310/156.56 |

(Continued)

FOREIGN PATENT DOCUMENTS

| | | |
|---|---|---|
| CN | 103078416 A | 5/2013 |
| CN | 105896773 A | 8/2016 |

(Continued)

*Primary Examiner* — Rashad H Johnson
(74) *Attorney, Agent, or Firm* — Maier & Maier, PLLC

(57) ABSTRACT

A radial flux motor, a powertrain, and a vehicle. The radial flux motor includes a rotor and a motor shaft. The rotor includes a plurality of magnetic steel slots and a plurality of magnetic steels. The magnetic steel slot penetrates through the rotor. Each magnetic steel slot is configured to accommodate one or more magnetic steels. A surface that is of at least one magnetic steel and that is spaced from a slot wall of the magnetic steel slot includes a plurality of primary grooves. The plurality of primary grooves are sequentially arranged at intervals in a length direction of the magnetic steel. A groove cutting position is selected based on eddy current loss density distribution of the magnetic steel, so that an eddy current loss of the magnetic steel in the radial flux motor can be effectively reduced.

20 Claims, 14 Drawing Sheets

(56) References Cited

U.S. PATENT DOCUMENTS

| | | | | |
|---|---|---|---|---|
| 7,906,882 B2* | 3/2011 | Okuma | H02K 1/276 | 310/156.56 |
| 8,536,748 B2* | 9/2013 | Liang | H02K 1/27 | 310/156.53 |
| 8,766,468 B1* | 7/2014 | Rilla | B60L 50/61 | 310/156.53 |
| 8,766,503 B2* | 7/2014 | Kagami | H02K 1/2766 | 310/216.096 |
| 8,896,175 B2* | 11/2014 | Cirani | H02K 1/2766 | 310/156.08 |
| 9,003,639 B2* | 4/2015 | Haruno | H02K 1/2766 | 29/598 |
| 9,825,493 B2* | 11/2017 | Moon | H02K 21/14 | |
| 10,491,064 B2* | 11/2019 | Tang | H02K 21/14 | |
| 10,666,099 B1* | 5/2020 | Fatemi | H02K 1/278 | |
| 10,958,120 B2* | 3/2021 | Tang | H02K 1/2766 | |
| 2011/0133590 A1* | 6/2011 | Lokhandwalla | H02K 1/2766 | 310/156.53 |
| 2013/0043757 A1* | 2/2013 | Kagami | H02K 1/2766 | 310/156.53 |
| 2013/0093279 A1* | 4/2013 | Yokota | H02K 1/2766 | 310/216.115 |
| 2013/0106226 A1* | 5/2013 | Aoyama | H02K 29/03 | 310/156.53 |
| 2013/0106227 A1* | 5/2013 | Aoyama | H02K 21/14 | 310/156.53 |
| 2013/0106228 A1* | 5/2013 | Aoyama | H02K 21/14 | 310/156.53 |
| 2013/0113327 A1* | 5/2013 | Morishita | H02K 1/274 | 310/156.53 |
| 2013/0113328 A1* | 5/2013 | Kogure | H02K 1/274 | 310/156.53 |
| 2013/0119810 A1* | 5/2013 | Aoyama | H02K 1/16 | 310/156.53 |
| 2013/0270956 A1* | 10/2013 | Yamaguchi | H02K 1/28 | 29/598 |
| 2014/0077653 A1* | 3/2014 | Takahashi | H02K 1/274 | 310/156.53 |
| 2014/0125184 A1* | 5/2014 | Takahashi | H02K 1/2766 | 310/156.53 |
| 2014/0167552 A1* | 6/2014 | Herranz Gracia | H02K 1/276 | 310/156.53 |
| 2014/0184009 A1* | 7/2014 | Taniguchi | H02K 1/2746 | 310/156.53 |
| 2014/0217849 A1* | 8/2014 | Soma | H02K 1/2766 | 310/156.53 |
| 2015/0171677 A1* | 6/2015 | Moon | H02K 1/2706 | 310/156.38 |
| 2015/0280499 A1* | 10/2015 | Pandi | H02K 1/2766 | 310/156.53 |
| 2016/0141926 A1* | 5/2016 | Kano | H02K 1/2766 | 310/156.53 |
| 2021/0006115 A1* | 1/2021 | Nehl | H02K 1/276 | |
| 2023/0198325 A1* | 6/2023 | Sanga | H02K 1/2766 | 310/156.53 |
| 2024/0223033 A1* | 7/2024 | Zhao | H02K 1/276 | |

FOREIGN PATENT DOCUMENTS

| | | |
|---|---|---|
| CN | 112039238 A | 12/2020 |
| CN | 114823025 A | 7/2022 |

* cited by examiner

RADIAL FLUX MOTOR, POWERTRAIN, AND VEHICLE

CROSS-REFERENCE TO RELATED APPLICATIONS

This application claims priority to Chinese Patent Application No. 202223613482.7, filed on Dec. 30, 2022, which is hereby incorporated by reference in its entirety.

TECHNICAL FIELD

The embodiments relate to the field of motor technologies, and to a radial flux motor, a powertrain, and a vehicle.

BACKGROUND

When a motor is operating, due to existence of space and time harmonics of a stator magnetic potential, a stator generates a harmonic magnetic field that rotates asynchronously relative to a rotor. When a magnetic steel is located in a changing magnetic field, an eddy current is generated. Generation of the eddy current causes heating of the magnetic steel, and heating of the magnetic steel causes an eddy current loss, for example, a waste of electric energy and a magnetic loss, resulting in deterioration of performance of the motor. Heating of the magnetic steel may further cause irreversible demagnetization of the magnetic steel, resulting in damage to the motor. Particularly, when the magnetic steel is made of a permanent magnet material with high conductivity, the eddy current loss of the magnetic steel is aggravated, and the performance of the motor is severely deteriorated.

SUMMARY

The embodiments include a magnetic steel, a radial flux motor, a powertrain, and a vehicle.

According to a first aspect, an embodiment provides a radial flux motor. The radial flux motor includes a rotor. The rotor is configured to be sleeved on a motor shaft and fixedly connected to the motor shaft. The rotor includes a plurality of magnetic steel slots and a plurality of magnetic steels. Each magnetic steel slot penetrates through the rotor, and each magnetic steel slot is configured to accommodate one or more magnetic steels. The magnetic steel is configured to interact with a stator of the radial flux motor. A force applied by the stator to the magnetic steel can enable the rotor to rotate and drive the motor shaft to rotate. A surface that is of at least one magnetic steel and that is spaced from a slot wall of the magnetic steel slot includes a plurality of primary grooves. The plurality of primary grooves are sequentially arranged at intervals in a length direction of the magnetic steel. The primary groove is used to reduce an eddy current loss caused in the magnetic steel when the magnetic steel interacts with the stator of the radial flux motor. The length direction of the magnetic steel is parallel or substantially parallel to an axial direction of the rotor.

In the radial flux motor provided in the embodiments, the surface that is of the magnetic steel and that is spaced from the slot wall of the magnetic steel slot includes the plurality of primary grooves, and the plurality of primary grooves divide the surface that is of the magnetic steel and that is spaced from the slot wall of the magnetic steel slot into a plurality of isolated regions, so that an eddy current is limited to a small region between two primary grooves, to effectively reduce a length of an eddy current loop of the magnetic steel, and significantly reduce an eddy current loss of the magnetic steel, so as to avoid a phenomenon such as heating and demagnetization of the magnetic steel caused by the eddy current loss, and improve performance of the radial flux motor. In addition, the eddy current of the magnetic steel is concentrated on the surface that is of the magnetic steel and that is spaced from the slot wall of the magnetic steel slot. In the radial flux motor provided in the embodiments, the surface that is of the magnetic steel and that is spaced from the slot wall of the magnetic steel slot includes the plurality of primary grooves, so that a relationship between reduction of the eddy current loss and reduction of a magnetic performance loss of the magnetic steel can be considered. In this way, the eddy current loss of the magnetic steel can be more effectively reduced, and impact on magnetic performance and material utilization of the magnetic steel can be avoided.

In an implementation, a surface of the magnetic steel includes a plurality of side faces, at least one of the plurality of side faces is spaced from the slot wall of the magnetic steel slot, and the at least one side face includes a plurality of primary grooves. The plurality of primary grooves are disposed on the side face spaced from the slot wall of the magnetic steel slot, and the primary groove can reduce the eddy current loss of the magnetic steel.

In an implementation, the magnetic steel includes a plurality of side faces parallel to the axial direction of the rotor, and at least one primary groove is disposed on a side face having a smallest area in the plurality of side faces.

In an implementation, the magnetic steel includes a plurality of side faces parallel to the axial direction of the rotor, one primary groove is disposed on a side face having a smallest area in the plurality of side faces, and the primary groove is located at a middle position of the side face in the axial direction of the rotor.

In an implementation, the magnetic steel includes a plurality of side faces parallel to the axial direction of the rotor, two or more primary grooves are disposed on a side face having a smallest area in the plurality of side faces, and the two or more primary grooves are distributed at intervals in the axial direction of the rotor.

In an implementation, a cross-sectional shape of the at least one magnetic steel in a direction perpendicular to the length direction of the magnetic steel is a rectangle, side faces corresponding to two short edges of the rectangle are spaced from the slot wall of the magnetic steel slot, and the side faces corresponding to the two short edges of the rectangle include a plurality of primary grooves. The eddy current loss of the magnetic steel is concentrated on the side faces corresponding to the two short edges of the rectangle. The side faces corresponding to the two short edges of the magnetic steel in the radial flux motor provided in the embodiments include the plurality of primary grooves, so that the eddy current loss of the magnetic steel can be more effectively reduced.

In an implementation, the magnetic steel includes a plurality of side faces parallel to the axial direction of the rotor, the plurality of side faces include two side faces having a smallest area, the two side faces having a smallest area are disposed opposite to each other, and at least one primary groove is disposed on each of the two side faces having a smallest area.

The eddy current loss of the magnetic steel is concentrated on the two side faces having a smallest area in the plurality of side faces, of the magnetic steel, parallel to the axial direction. The two side faces having a smallest area of the magnetic steel in the radial flux motor provided in the embodiments include a plurality of primary grooves. In this way, the magnetic performance of the magnetic steel can be retained to a maximum extent, and the eddy current loss of the magnetic steel can be effectively reduced.

In an implementation, each of the two side faces having a smallest area includes a plurality of primary grooves arranged in parallel in the axial direction, and primary grooves on the two side faces having a smallest area are parallel to each other.

In an implementation, each of the two side faces having a smallest area includes a plurality of primary grooves arranged in parallel in the axial direction, and two primary grooves located on different side faces intersect.

In an implementation, a primary groove on one side face having a smallest area is disposed symmetrically with a primary groove on the other side face having a smallest area. An orthographic projection of the primary groove on the one side face having a smallest area on the other side face having a smallest area overlaps an orthographic projection of the primary groove on the other side face having a smallest area on the other side face having a smallest area. This setting facilitates processing.

In an implementation, a primary groove on one side face having a smallest area is disposed in a staggered manner with a primary groove on the other side face having a smallest area. An orthographic projection of the primary groove on the one side face having a smallest area on the other side face having a smallest area does not overlap an orthographic projection of the primary groove on the other side face having a smallest area on the other side face having a smallest area. This setting helps improve rigidity of the magnetic steel after a groove is disposed, and when disposing is performed in the staggered manner, a primary groove with a larger depth can be disposed.

In an implementation, the magnetic steel includes two side faces spaced from the slot wall of the magnetic steel slot, and an arrangement direction of the two side faces intersects with an arrangement direction of a magnetic south pole and a magnetic north pole of the magnetic steel.

In an implementation, the magnetic steel includes a plurality of side faces parallel to the axial direction of the rotor, the plurality of side faces include two side faces that are disposed opposite to each other and that have a smallest area, and an arrangement direction of the two side faces having a smallest area intersects with an arrangement direction of a magnetic south pole and a magnetic north pole of the magnetic steel.

In an implementation, at least one of groove spacings between or groove depths of the plurality of primary grooves includes at least two values. The groove spacing is a distance between two adjacent primary grooves, and the groove depth is a distance between a groove opening and a groove bottom of the primary groove. The groove spacings between or the groove depths of the plurality of primary grooves are set in a diversified manner, so that when the magnetic steel is mounted on different types of radial flux motors, the eddy current loss of the magnetic steel can be well reduced.

In an implementation, the magnetic steel includes a plurality of side faces parallel to the axial direction of the rotor, a plurality of primary grooves are disposed on a side face with a smallest area in the plurality of side faces, and the plurality of primary grooves are unevenly distributed on the side face in the axial direction of the rotor. Uneven distribution means that depths of or spacings between the primary grooves are unevenly distributed. For example, depths of two adjacent primary grooves are different, or spacings between two adjacent primary grooves in three consecutively distributed primary grooves are different.

In an implementation, included angles between extension directions of the plurality of primary grooves and the length direction of the magnetic steel include one or more angle values. The one or more angle values include at least one of 90 degrees and a value less than 90 degrees. The extension direction of the primary groove intersects with the length direction of the magnetic steel, to help dispose the groove on the magnetic steel. The included angles between the extension directions of the plurality of primary grooves and the length direction of the magnetic steel are set in a diversified manner, so that when the magnetic steel is mounted on different types of radial flux motors, the eddy current loss of the magnetic steel can be well reduced.

In an implementation, the plurality of primary grooves are arranged in the axial direction, and all of the plurality of primary grooves are parallel to each other. In an implementation, extension lines of at least two of the plurality of primary grooves intersect.

In an implementation, in the length direction of the magnetic steel, a distance between any primary groove and any end of the magnetic steel is greater than or equal to $\frac{1}{6}$ of a length of the magnetic steel.

In an implementation, the magnetic steel includes a plurality of side faces parallel to the axial direction of the rotor, a plurality of primary grooves are disposed on a side face having a smallest area in the plurality of side faces, and in the length direction of the magnetic steel, a distance between any primary groove and any end of the magnetic steel is greater than or equal to $\frac{1}{6}$ of a length of the magnetic steel.

Eddy current loss density on the magnetic steel is related to the length of the magnetic steel. Eddy current loss density at a middle position of the magnetic steel is higher than that at two ends of the magnetic steel in the length direction of the magnetic steel. In the embodiments, a position of the primary groove is selected based on the length of the magnetic steel, and the primary groove is disposed close to a middle of the magnetic steel in the length direction of the magnetic steel, so that a length of an eddy current loop generated in the magnetic steel can be more effectively reduced, the eddy current loss of the magnetic steel can be significantly reduced, and a performance indicator of the radial flux motor can be improved.

In an implementation, a plurality of primary grooves are disposed on the magnetic steel, and a distance between any primary groove and any end of the magnetic steel is greater than or equal to $\frac{1}{6}$ of a length of the magnetic steel, and is less than $\frac{1}{2}$ of the length of the magnetic steel.

In an implementation, the magnetic steel includes a plurality of side faces parallel to the axial direction of the rotor, a plurality of primary grooves are disposed on a side face having a smallest area in the plurality of side faces, and in the length direction of the magnetic steel, a distance between any primary groove and any end of the magnetic steel is greater than or equal to $\frac{3}{8}$ of a length of the magnetic steel.

In an implementation, a largest depth of the plurality of primary grooves is greater than or equal to $\frac{1}{10}$ of a width of the magnetic steel in a depth direction of the primary groove, and is less than or equal to $\frac{1}{3}$ of the width of the magnetic steel in the depth direction of the primary groove.

The eddy current of the magnetic steel is located on the surface of the magnetic steel and has a specific depth. The depth is related to the width of the magnetic steel. The width direction of the magnetic steel is a depth direction of the eddy current. The magnetic steel in the provided radial flux motor includes the plurality of primary grooves, and the largest depth of the plurality of primary grooves is controlled to be between $\frac{1}{10}$ and $\frac{1}{3}$ of the width of the magnetic steel, so that an eddy current path in the magnetic steel can be more effectively damaged, a length of an eddy current loop generated in the magnetic steel can be reduced, the eddy current loss of the magnetic steel can be significantly reduced, and a performance indicator of the radial flux motor can be improved.

In an implementation, a primary groove with a largest depth in the plurality of primary grooves is located at a middle position of the plurality of primary grooves in the axial direction. There is a largest eddy current loss at the middle position of the magnetic steel, and the primary groove with a largest depth in the plurality of primary grooves is located at the middle position of the plurality of primary grooves in the axial direction, so that an eddy current path in the magnetic steel can be more effectively damaged, and the eddy current loss of the magnetic steel can be significantly reduced.

In an implementation, in the length direction of the magnetic steel, a distance between the primary groove with a largest depth in the plurality of primary grooves and each of the two ends of the magnetic steel is half of the length of the magnetic steel.

In an implementation, in the length direction of the magnetic steel, the depths of the plurality of primary grooves are first increased and then decreased, and in the length direction of the magnetic steel, the eddy current loss density on the magnetic steel is first increased and then decreased. The magnetic steel in the radial flux motor provided in the embodiments includes the plurality of primary grooves, and the depths of the plurality of primary grooves are first increased and then decreased in the length direction of the magnetic steel. In this way, the eddy current loss of the magnetic steel can be reduced, and the magnetic performance of the magnetic steel can be retained to a maximum extent.

In an implementation, in the length direction of the magnetic steel, the plurality of primary grooves are distributed at equal intervals, and the depths of the plurality of primary grooves are first increased and then decreased.

In an implementation, in the length direction of the magnetic steel, a longer minimum distance between the primary groove and each of the two ends of the magnetic steel indicates a larger depth of the primary groove.

In an implementation, in the length direction of the magnetic steel, spacings between two adjacent primary grooves in the plurality of primary grooves are first decreased and then increased, and in the length direction of the magnetic steel, the eddy current loss density on the magnetic steel is first increased and then decreased. The magnetic steel in the radial flux motor provided in the embodiments includes the plurality of primary grooves, and the spacings between two adjacent primary grooves are first decreased and then increased in the length direction of the magnetic steel. In this way, the eddy current loss of the magnetic steel can be reduced, and the magnetic performance of the magnetic steel can be retained to a maximum extent.

In an implementation, in the length direction of the magnetic steel, distribution density of the plurality of primary grooves is first increased and then decreased.

In an implementation, the depths of the plurality of primary grooves are equal, and in the length direction of the magnetic steel, spacings between two adjacent primary grooves in the plurality of primary grooves are first decreased and then increased.

In an implementation, in the length direction of the magnetic steel, there is higher distribution density of the primary groove at a part with a longer minimum distance from each of the two ends of the magnetic steel.

In an implementation, in the length direction of the magnetic steel, the depths of the plurality of primary grooves are first increased and then decreased, and spacings between two adjacent primary grooves in the plurality of primary grooves are first decreased and then increased, and in the length direction of the magnetic steel, the eddy current loss density on the magnetic steel is first increased and then decreased. The magnetic steel in the radial flux motor provided in the embodiments includes the plurality of primary grooves, the depths of the plurality of primary grooves are first increased and then decreased, and the groove spacings are first decreased and then increased in the length direction of the magnetic steel. In this way, the eddy current loss of the magnetic steel can be reduced, and the magnetic performance of the magnetic steel can be retained to a maximum extent.

In an implementation, in the axial direction of the rotor, a longer minimum distance between the primary groove and each of the two ends of the magnetic steel indicates a larger depth of the primary groove, and there is higher distribution density of the primary groove at a part with a longer minimum distance from each of the two ends of the magnetic steel.

In an implementation, the at least one primary groove includes a plurality of first primary grooves and a plurality of second primary grooves. In the axial direction of the rotor, the plurality of first primary grooves and the plurality of second primary grooves are sequentially alternately disposed, and a depth of the first primary groove is different from a depth of the second primary groove. When an environment in which the magnetic steel is located is changed, eddy current distribution density on the magnetic steel is changed. The depth and a distribution manner of the primary groove are also accordingly changed, so that groove cutting of the magnetic steel is adapted to the eddy current distribution density, to more effectively reduce the eddy current loss of the magnetic steel.

In an implementation, the at least one primary groove includes a plurality of primary grooves, and a value of a spacing between two adjacent primary grooves in the plurality of primary grooves is greater than or equal to 0.5 millimeter, and is less than or equal to 500 millimeters. The spacing between two adjacent primary grooves in the plurality of primary grooves is set based on the length of the magnetic steel and eddy current loss density on the magnetic steel, to effectively reduce the eddy current loss of the magnetic steel, and reduce a magnetic performance loss of the magnetic steel, so as to improve a performance indicator of the radial flux motor.

In an implementation, a value of a width of the primary groove in the axial direction of the rotor is greater than or equal to 0.01 millimeter, and is less than or equal to 1 millimeter.

The width of the primary groove is set to be less than or equal to 1 millimeter. The width of the primary groove is set to be small, so that after a groove is disposed, a size loss of the magnetic steel is small, and the magnetic performance of the magnetic steel can be well retained. The width of the primary groove is set to be greater than or equal to 0.01 millimeter, so that the primary groove has good isolation performance, and an eddy current path can be cut off to reduce the eddy current loss.

In an implementation, at least one adjacent side face of the side face on which the plurality of primary grooves are located includes a plurality of secondary grooves, and at least one secondary groove communicates with one primary groove. The secondary groove can be disposed based on distribution of the eddy current loss of the magnetic steel, to effectively reduce the eddy current loss.

In an implementation, all of the secondary grooves communicate with the primary groove. In an implementation, some secondary grooves communicate with the primary groove, and some secondary grooves do not communicate with the primary groove.

In an implementation, at least one of groove spacings between or groove depths of the plurality of secondary grooves includes at least two values. The groove spacing between the secondary grooves is a distance between two adjacent secondary grooves, and the groove depth of the secondary groove is a distance between a groove opening and a groove bottom of the secondary groove. Values of the groove spacings between and the groove depths of the plurality of secondary grooves may be set based on the distribution of the eddy current loss of the magnetic steel. At a corresponding position at which the eddy current loss of the magnetic steel is large, a groove spacing between the secondary grooves on the magnetic steel may be set to be small, or a groove depth of the secondary groove may be set to be larger, to more effectively reduce the eddy current loss of the magnetic steel.

In an implementation, the groove spacings between the plurality of secondary grooves include at least two values.

In an implementation, the groove depths of the plurality of secondary grooves include at least two values.

In an implementation, each of the groove spacings between and the groove depths of the plurality of secondary grooves includes at least two values.

In an implementation, an angle value of an included angle between an extension direction of one or more consecutive secondary grooves in the plurality of secondary grooves and the length direction of the magnetic steel is 90 degrees, and an angle value of an included angle between an extension direction of one or more other consecutive secondary grooves in the plurality of secondary grooves and the length direction of the magnetic steel is less than 90 degrees. The extension direction of the secondary groove intersects with the length direction of the magnetic steel, to help dispose the groove on the magnetic steel. Included angles between extension directions of the plurality of secondary grooves and the length direction of the magnetic steel are set in a diversified manner, so that when the magnetic steel is mounted on different types of radial flux motors, the eddy current loss of the magnetic steel can be well reduced.

In an implementation, an angle value of an included angle between an extension direction of one or more secondary grooves in the plurality of secondary grooves and the length direction of the magnetic steel is 90 degrees, and an angle value of an included angle between an extension direction of one or more other secondary grooves in the plurality of secondary grooves and the length direction of the magnetic steel is less than 90 degrees.

In an implementation, angle values of included angles between extension directions of a plurality of consecutive secondary grooves in the plurality of secondary grooves and the length direction of the magnetic steel are 90 degrees, and angle values of included angles between extension directions of a plurality of other secondary grooves in the plurality of secondary grooves and the length direction of the magnetic steel are less than 90 degrees.

In an implementation, an angle value of an included angle between an extension direction of each of the plurality of secondary grooves and the length direction of the magnetic steel is 90 degrees, to help dispose the secondary groove on the magnetic steel.

In an implementation, extension directions of the plurality of secondary grooves are parallel to each other, and angle values of included angles between the extension directions of the plurality of secondary grooves and the length direction of the magnetic steel are less than 90 degrees. This setting helps dispose the secondary groove on the magnetic steel 110.

In an implementation, a surface that is of the at least one magnetic steel and that is in contact with the slot wall of the magnetic steel slot includes a plurality of secondary grooves, and the plurality of secondary grooves are sequentially arranged at intervals in the length direction of the magnetic steel. The secondary groove is disposed, to more effectively reduce the eddy current loss of the magnetic steel.

In an implementation, each magnetic steel slot includes a plurality of magnetic steels that are sequentially arranged adjacent to each other, and at least one primary groove on one of two adjacent magnetic steels communicates with at least one primary groove on the other magnetic steel. In an implementation, one magnetic steel slot includes two magnetic steels. The two magnetic steels are disposed side by side in an arrangement direction of a magnetic south pole and a magnetic north pole of the magnetic steel. A side face on which a primary groove on one magnetic steel is located is disposed coplanar with a side face on which a primary groove on the other magnetic steel is located, and the primary groove on the one magnetic steel communicates with the primary groove on the other magnetic steel. Each magnetic steel slot may include a plurality of magnetic steels. A size of the magnetic steel is reduced, to better reduce the eddy current loss of the magnetic steel. Primary grooves on two adjacent magnetic steels communicate with each other, to help dispose a groove on the magnetic steel.

In an implementation, two magnetic steel slots are axially symmetrical in a radial direction of the rotor, quantities of magnetic steels in the two magnetic steel slots are the same, quantities of, groove spacings between, and groove depths of a plurality of primary grooves on the magnetic steels in the two magnetic steel slots are the same, and quantities of and groove spacings between a plurality of secondary grooves on the magnetic steels in the two magnetic steel slots are the same. This setting enables processing and mounting of the magnetic steel to be more convenient.

In an implementation, a plurality of magnetic steels are disposed on the rotor. The plurality of magnetic steels are disposed inside a rotor core in a circumferential direction of the motor shaft. Two adjacent magnetic steels are disposed in a "V" shape, and in the two adjacent magnetic steels, side faces on which a plurality of primary grooves are disposed are located at a tip of the "V" shape.

According to a second aspect, the embodiments provide a magnetic steel used for a radial flux motor. A cross-sectional shape of at least one magnetic steel in a direction perpendicular to a length direction of the magnetic steel is a rectangle. At least one of side faces corresponding to two short edges of the rectangle includes a plurality of primary grooves. The plurality of primary grooves are sequentially arranged at intervals in the length direction of the magnetic steel. At least one adjacent side face of the side face on which the plurality of primary grooves are located includes a plurality of secondary grooves. The plurality of secondary grooves are arranged at intervals in the length direction of the magnetic steel. At least one secondary groove communicates with one primary groove.

A groove cutting position is selected based on eddy current loss density distribution of the magnetic steel, so that when the magnetic steel is mounted on the radial flux motor, an eddy current loss of the magnetic steel can be reduced, and magnetic performance of the magnetic steel can be retained to a maximum extent, to improve performance of the radial flux motor.

In an implementation, each of the side faces corresponding to the two short edges of the rectangle includes a plurality of primary grooves.

In an implementation, an arrangement direction of the side faces corresponding to the two short edges of the rectangle intersects with an arrangement direction of a magnetic south pole and a magnetic north pole of the magnetic steel.

In an implementation, included angles between extension directions of the plurality of primary grooves and the length direction of the magnetic steel include one or more angle values. The one or more angle values include at least one of 90 degrees and a value less than 90 degrees.

In an implementation, at least one of groove spacings between or groove depths of the plurality of primary grooves includes at least two values. The groove spacing is a distance between two adjacent primary grooves, and the groove depth is a distance between a groove opening and a groove bottom of the primary groove.

In an implementation, in the length direction of the magnetic steel, a distance between any primary groove and any end of the magnetic steel is greater than or equal to ⅙ of a length of the magnetic steel.

In an implementation, in the length direction of the magnetic steel, a distance between any primary groove and any end of the magnetic steel is greater than or equal to ⅜ of a length of the magnetic steel.

In an implementation, a largest depth of the plurality of primary grooves is greater than or equal to 1/10 of a width of the magnetic steel in a depth direction of the primary groove, and is less than or equal to ⅓ of the width of the magnetic steel in the depth direction of the primary groove.

In an implementation, a value of a spacing between two adjacent primary grooves in the plurality of primary grooves is greater than or equal to 0.5 millimeter, and is less than or equal to 500 millimeters.

In an implementation, a value of a width of the primary groove in the length direction of the magnetic steel is greater than or equal to 0.01 millimeter, and is less than or equal to 1 millimeter.

In an implementation, in the length direction of the magnetic steel, the depths of the plurality of primary grooves are first increased and then decreased.

In an implementation, the plurality of primary grooves are distributed at equal intervals in the length direction of the magnetic steel, and the depths of the plurality of primary grooves are first increased and then decreased in the length direction of the magnetic steel.

In an implementation, in the length direction of the magnetic steel, spacings between two adjacent primary grooves in the plurality of primary grooves are first decreased and then increased.

In an implementation, the depths of the plurality of primary grooves are equal, and in the length direction of the magnetic steel, spacings between two adjacent primary grooves in the plurality of primary grooves are first decreased and then increased.

In an implementation, in the length direction of the magnetic steel, the depths of the plurality of primary grooves are first increased and then decreased, and spacings between two adjacent primary grooves in the plurality of primary grooves are first decreased and then increased.

In an implementation, at least one of groove spacings between or groove depths of the plurality of secondary grooves includes at least two values. The groove spacing between the secondary grooves is a distance between two adjacent secondary grooves, and the groove depth of the secondary groove is a distance between a groove opening and a groove bottom of the secondary groove.

In an implementation, an angle value of an included angle between an extension direction of one or more consecutive secondary grooves in the plurality of secondary grooves and the length direction of the magnetic steel is 90 degrees, and an angle value of an included angle between an extension direction of one or more other consecutive secondary grooves in the plurality of secondary grooves and the length direction of the magnetic steel is less than 90 degrees.

According to a third aspect, the embodiments provide a powertrain. The powertrain includes a gearbox and the radial flux motor described above. The gearbox includes a power input shaft. A motor shaft of the radial flux motor is connected to the power input shaft through transmission, and is configured to transmit power to the power input shaft.

According to a fourth aspect, the embodiments provide a vehicle. The vehicle includes a frame and the powertrain described above. The powertrain is mounted on the frame.

BRIEF DESCRIPTION OF DRAWINGS

To describe solutions in embodiments more clearly, the following describes accompanying drawings used in embodiments.

DETAILED DESCRIPTION OF EMBODIMENTS

The following describes the solutions in embodiments with reference to the accompanying drawings. It is clear that the described embodiments are merely some, but not all, possible embodiments.

Terms "first", "second", and the like are merely used for a purpose of description, and cannot be understood as an indication or implication of relative importance or an implicit indication of a quantity of indicated features. Therefore, a feature limited by "first" or "second" may explicitly or implicitly include one or more features. In the descriptions of the embodiments, unless otherwise stated, "a plurality of" means two or more.

In addition, position terms such as "up" and "down" are defined relative to example positions of structures in the accompanying drawings. It should be understood that these position terms are relative concepts, are used for relative description and clarification, and may be correspondingly changed based on changes in the positions of the structures.

For ease of understanding, the following first explains and describes English abbreviations and related terms used in embodiments.

An eddy current (EC), is also referred to as a Foucault current, and is a current induced in a conductor when the conductor moves in a non-uniform magnetic field or is in a magnetic field that changes with time.

An eddy current loss is an energy loss caused by a current induced in a conductor when the conductor moves in a non-uniform magnetic field or is in a magnetic field that changes with time.

Parallelism: Parallelism is not limited to absolute parallelism. A definition of parallelism may be understood as basic parallelism, and a case of non-absolute parallelism caused by factors such as an assembly tolerance, a design tolerance, and structural flatness is allowed.

The radial flux motor 10 may be used in various fields such as aviation, national defense, industrial and agricultural production, and daily life. For example, the radial flux motor 10 may be used in an industrial driving apparatus, an automation device, a fan, a pump, a compressor, a machine tool, a robot, an aircraft, a ship, and a vehicle 1.

Figure 1:
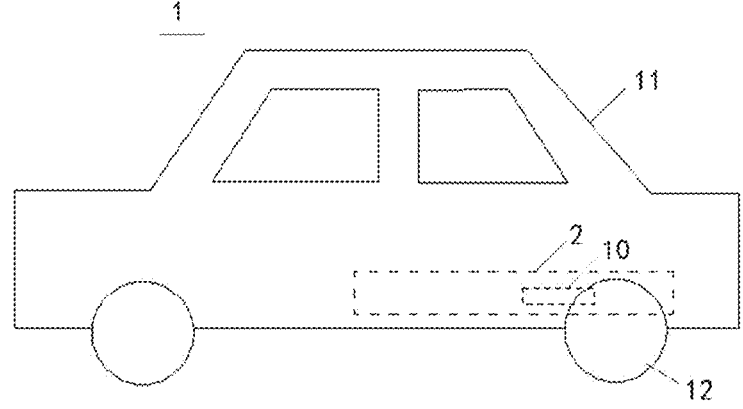
FIG. 1 is a schematic diagram of a vehicle according to an implementation.

FIG. 1 is a schematic diagram of a vehicle 1 according to an implementation. The vehicle 1 includes a vehicle body 11 and a powertrain 2. The powertrain 2 includes a radial flux motor 10. The powertrain 2 is mounted on the vehicle body 11, and the powertrain 2 can drive a wheel 12 to rotate to provide power for the vehicle 1.

The vehicle 1 includes a three-wheeled or four-wheeled vehicle. In an implementation, the vehicle 1 includes a car, an off-road vehicle, a bus, a truck, and the like, and the vehicle 1 further includes various special operation vehicles with specific functions. For example, the vehicle 1 is one of an engineering rescue vehicle, a sprinkler, a suction sewage truck, a cement mixer, a crane, or a medical vehicle. In an implementation, the vehicle 1 may alternatively be an electric vehicle or a fuel vehicle. For example, the vehicle 1 is one of a pure electric vehicle/battery electric vehicle (PEV/BEV), a hybrid electric vehicle (HEV), a range-extended electric vehicle (REEV), a plug-in hybrid electric vehicle (PHEV), or a new energy vehicle.

Figure 2:
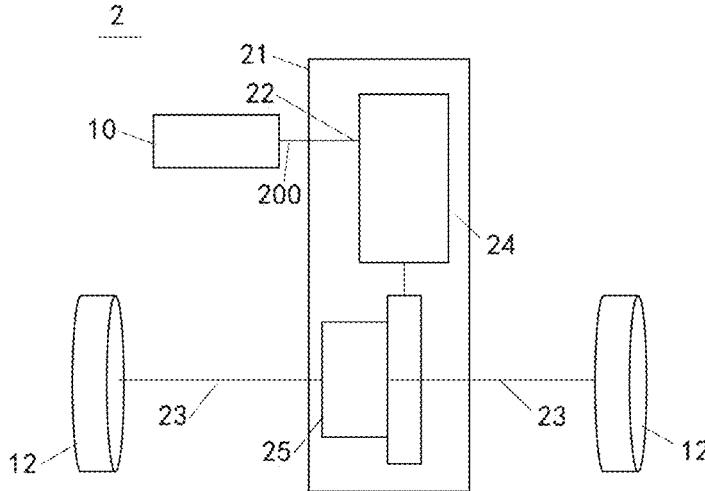
FIG. 2 is a schematic diagram of a powertrain according to an implementation.

FIG. 2 is a schematic diagram of a powertrain 2 according to an implementation. The powertrain 2 includes a gearbox 21 and a radial flux motor 10. The gearbox 21 includes a power input shaft 22. The radial flux motor 10 includes a motor shaft 200. The motor shaft 200 of the radial flux motor 10 is connected to the power input shaft 22 through transmission, and the motor shaft 200 is configured to transmit power to the power input shaft 22. The motor shaft 200 of the radial flux motor 10 is fixedly connected to the power input shaft 22 of the gearbox 21, and rotation of the motor shaft 200 may drive the power input shaft 22 to rotate, so that power output by the radial flux motor 10 is transferred to the power input shaft 22. In an implementation, the motor shaft 200 and the power input shaft 22 may be a same shaft.

In an implementation, the gearbox 21 includes a wheel driving half shaft 23, a gear assembly 24, and a differential 25. The wheel driving half shaft 23 is fixedly connected to a wheel 12. The gear assembly 24 receives power transmitted by the power input shaft 22, and transfers the power to the wheel driving half shaft 23 through the differential 25, to drive the wheel 12 to rotate. The gear assembly 24 can change a transmission ratio of the radial flux motor 10 to the wheel 12. The gear assembly 24 may be disposed based on a requirement, and may be a single-gear deceleration gear assembly, or a two-gear or multi-gear deceleration gear assembly. The differential 25 can enable left and right (or front and rear) wheels to rotate at different rotational speeds.

In an implementation, the radial flux motor 10 and the gearbox 21 may be integrated into a same housing.

Figure 3:
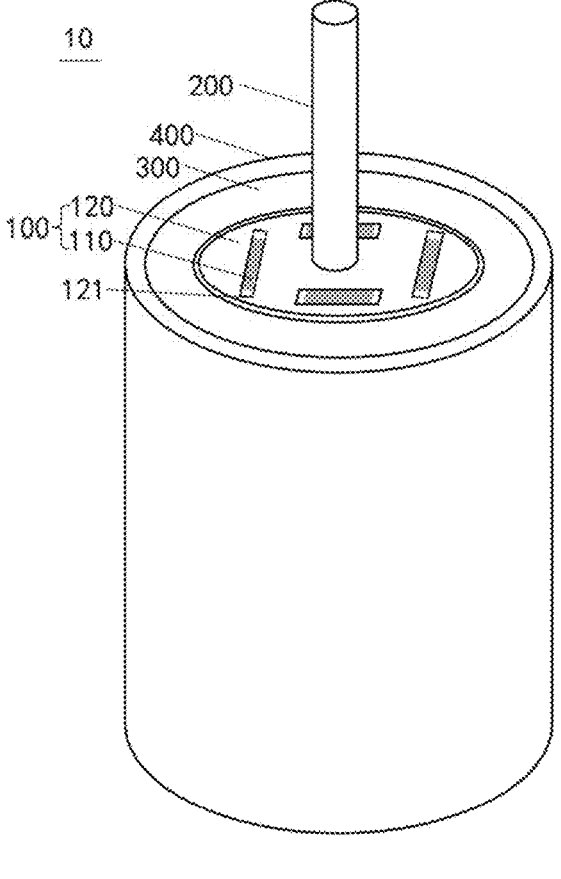
FIG. 3 is a schematic diagram of a structure of a radial flux motor according to an implementation.

FIG. 3 is a schematic diagram of a structure of a radial flux motor 10 according to an implementation. The radial flux motor 10 is configured to convert electric energy into mechanical energy. The radial flux motor 10 includes a stator 300, a rotor 100, and a motor shaft 200. The rotor 100 is sleeved on and fastened to the motor shaft 200, and can rotate relative to the stator 300. When the radial flux motor 10 works, a magnetic field of the stator 300 interacts with a magnetic field of the rotor 100, so that the rotor 100 rotates relative to the stator 300. When the rotor 100 rotates, the motor shaft 200 can be driven to rotate, and the radial flux motor 10 outputs power through the motor shaft 200.

In an implementation, the stator 300 includes a stator core and a stator winding. The rotor 100 includes a rotor core 120 and a magnetic steel 110. The stator winding is configured to generate the magnetic field of the stator 300. The magnetic steel 110 is a permanent magnet. The magnetic steel 110 is configured to generate the magnetic field of the rotor 100. The stator core and the rotor core 120 are used for magnetic conduction, to increase an interaction force between the magnetic field of the stator 300 and the magnetic field of the rotor 100. After a three-phase current is applied to the stator winding, a rotating magnetic field is formed in the stator winding, and a magnetic pole of the magnetic steel 110 is fixed. Based on a principle of attraction between same magnetic poles and repulsion between different magnetic poles, the rotating magnetic field generated by the stator winding drives the magnetic steel 110 to rotate, so as to drive the rotor 100 to rotate.

In an implementation, a material of the magnetic steel 110 may be one or more of natural magnetite ($Fe_3O_4$), carbon steel, tungsten steel, cobalt steel, an aluminum-nickel-cobalt permanent magnet material, a ferrite permanent magnet material, a samarium-cobalt permanent magnet material, or a neodymium-ferro-boron permanent magnet material.

In an implementation, each of the stator core and the rotor core 120 is formed by laminating a plurality of layers of silicon steel sheets. Two sides of the silicon steel sheet are coated with insulation paint. The silicon steel sheets are insulated from each other, to reduce core losses of the stator core and the rotor core 120 in the rotating magnetic field. In an implementation, the stator core and the rotor core 120 are of solid structures.

In an implementation, the rotor core 120 is in a cylindrical shape that has a hole in the middle. The rotor core 120 is coaxially disposed with the motor shaft 200, and the rotor core 120 is sleeved on an outer circumferential side of the motor shaft 200.

In an implementation, the radial flux motor 10 further includes a base 400. The base 400 is located on an outer circumferential side of the stator 300. The base 400 is configured to fasten and support the stator core. The base 400 has specific mechanical strength and rigidity, and can withstand various forces in a running or transportation process of the radial flux motor 10.

In an implementation, the radial flux motor 10 may be a permanent magnet synchronous motor. In an implementation, the radial flux motor 10 includes one of a sine wave permanent magnet synchronous motor, a trapezoidal wave permanent magnet synchronous motor, or a built-in permanent magnet synchronous reluctance motor. In an implementation, the radial flux motor 10 further includes one of a disc permanent magnet motor or a permanent magnet direct current motor.

The following describes in detail the radial flux motor 10 in the embodiments.

Figure 4:
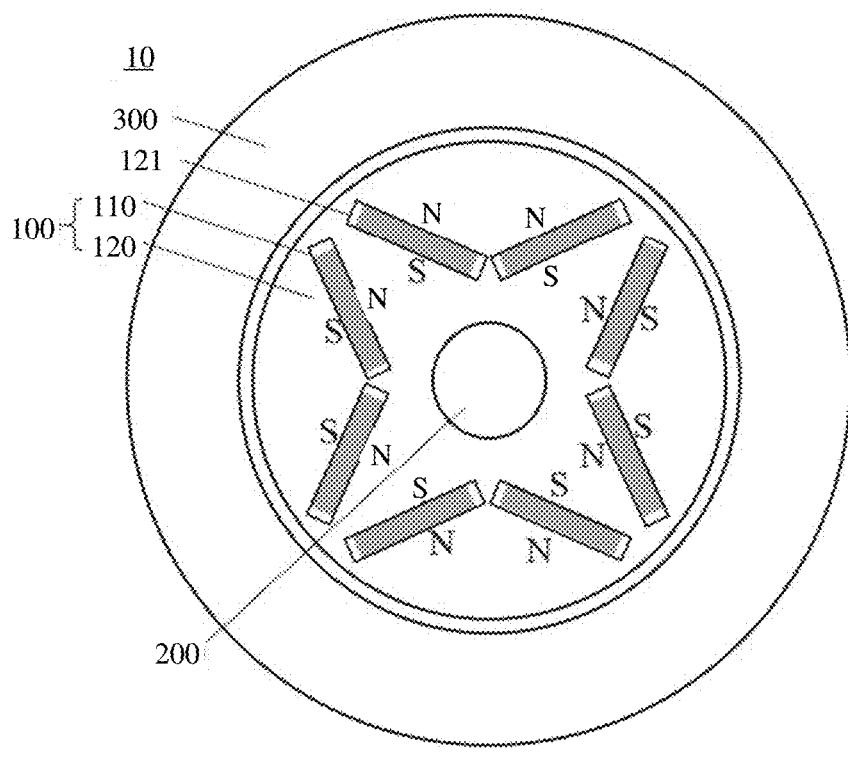
FIG. 4 is a top view of a radial flux motor according to an implementation.
Figure 5A:
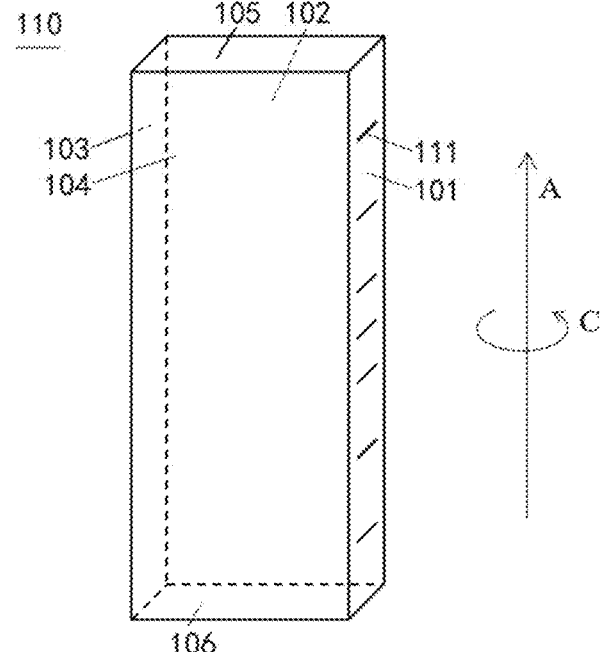
FIG. 5a is a schematic diagram of a magnetic steel according to an implementation.
Figure 5B:
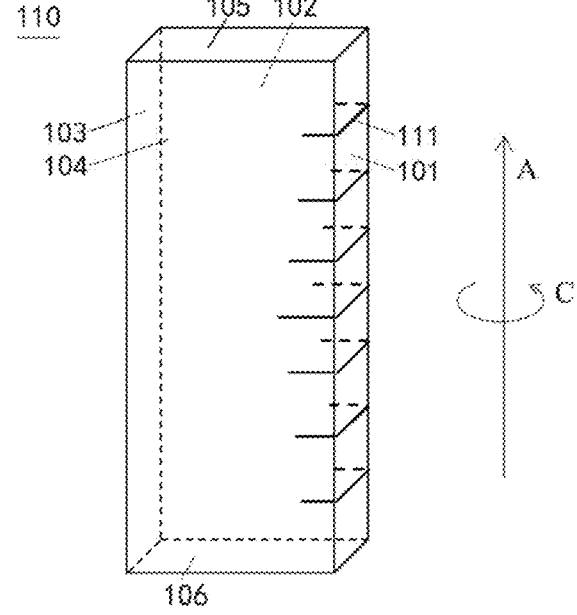
FIG. 5b is a schematic diagram of a magnetic steel according to an implementation.
Figure 6:
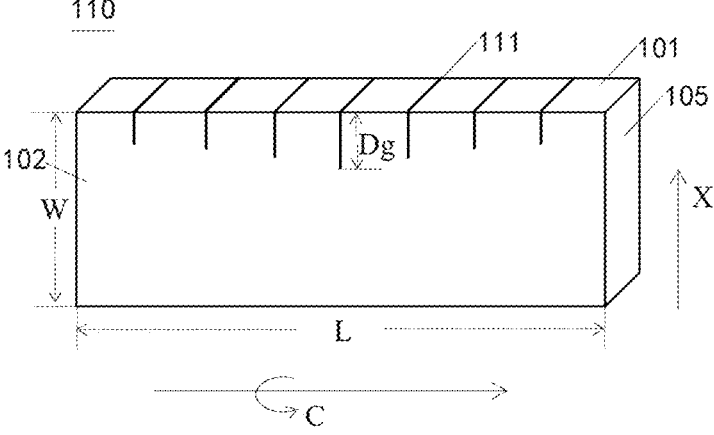
FIG. 6 is a schematic diagram of a magnetic steel according to an implementation.
Figure 7:
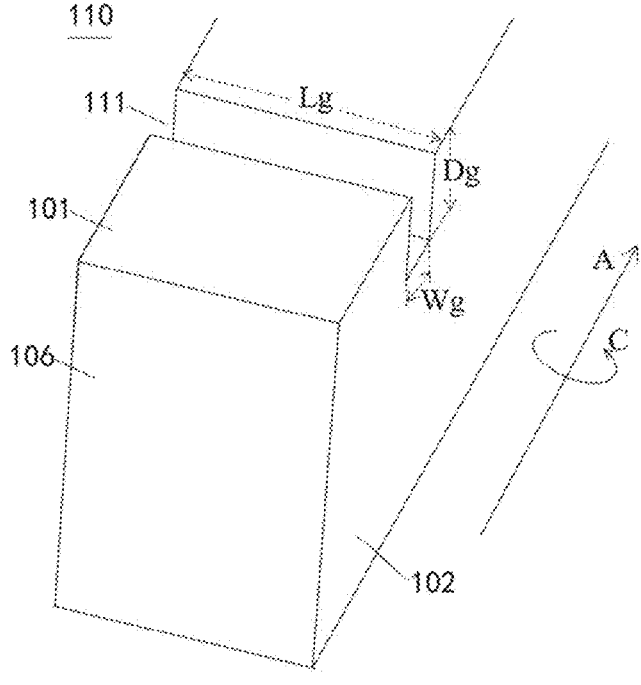
FIG. 7 is a partial schematic diagram of a magnetic steel according to an implementation.

FIG. 4 is a top view of a radial flux motor 10 according to an implementation, FIG. 5b and FIG. 6 are schematic diagrams of a magnetic steel 110 from different perspectives, and FIG. 7 is a partial schematic diagram of a magnetic steel 110 according to an implementation.

An embodiment provides a radial flux motor 10. The radial flux motor 10 includes a motor shaft 200 and a rotor 100 (as shown in FIG. 4). The rotor 100 is sleeved on the motor shaft 200. The rotor 100 includes a plurality of magnetic steel slots 121 and a plurality of magnetic steels 110. The magnetic steel slot 121 penetrates through the rotor, and each magnetic steel slot 121 is configured to accommodate one or more magnetic steels 110. A surface that is of at least one magnetic steel 110 and that is spaced from a slot wall of the magnetic steel slot 121 includes a plurality of primary grooves 111. The plurality of primary grooves 111 are sequentially arranged at intervals in a length direction of the magnetic steel 110.

The rotor 100 is fixedly connected to the motor shaft 200, and when the rotor 100 rotates, the motor shaft 200 can be driven to rotate. An axial direction A of the rotor 100 is the same as an axial direction of the motor shaft 200. The magnetic steel slot 121 penetrates through two end faces of the rotor 100 in the axial direction A of the rotor 100. The magnetic steel 110 is fastened to the magnetic steel slot 121. The length direction of the magnetic steel 110 is parallel or substantially parallel to the axial direction A of the rotor 100. In the axial direction A of the rotor 100, a length of the magnetic steel 110 is less than or equal to a length of the magnetic steel slot 121. At least some surfaces of the magnetic steel 110 are spaced from the slot wall of the magnetic steel slot 121. The primary groove 111 is disposed on a surface that is of the magnetic steel 110 and that is spaced from the slot wall of the magnetic steel slot 121.

In an implementation, the rotor 100 includes a rotor core 120 and the magnetic steel 110. The magnetic steel slot 121 is disposed in the rotor core 120, and penetrates through two end faces of the rotor core 120 in the axial direction A. In the axial direction A of the rotor 100, the length of the magnetic steel 110 is less than or equal to a length of the rotor core 120.

Figure 13:
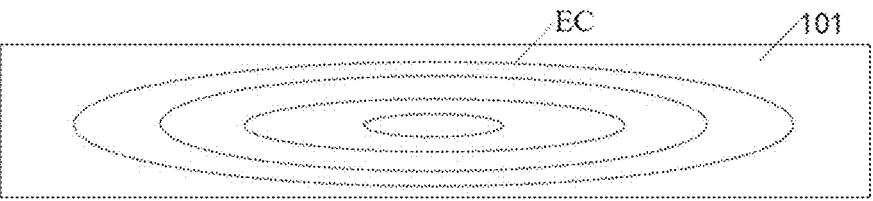
FIG. 13 is a schematic diagram of an eddy current existing before groove cutting is performed on a first side face.
Figure 14:
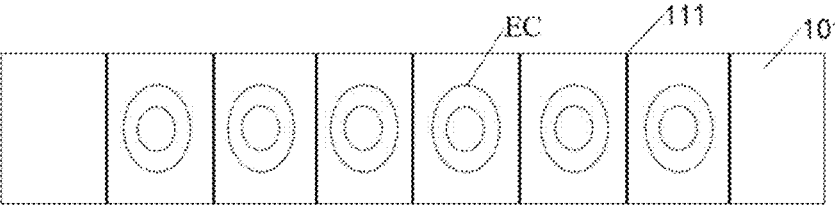
FIG. 14 is a schematic diagram of an eddy current existing after groove cutting is performed on a first side face.

When the radial flux motor 10 works, due to existence of space and time harmonics of a stator magnetic potential, a stator generates a harmonic magnetic field that rotates asynchronously relative to the rotor. When the magnetic steel 110 is located in a changing magnetic field, an eddy current is generated (as shown in FIG. 13 and FIG. 14). The eddy current is located on the surface of the magnetic steel 110 and extends inwards. Generation of the eddy current causes heating of the magnetic steel 110, and heating of the magnetic steel 110 causes an eddy current loss, for example, a waste of electric energy and a magnetic loss, resulting in deterioration of performance of the radial flux motor 10. Heating of the magnetic steel 110 even causes irreversible demagnetization of the magnetic steel 110, resulting in damage to the radial flux motor 10. For example, when no primary groove 111 is disposed on the surface of the magnetic steel 110 (as shown in FIG. 13), a path of the eddy current of the magnetic steel 110 is long, and a long eddy current path causes a large eddy current loss. Additionally, when the magnetic steel 110 is made of a permanent magnet material with high conductivity, the eddy current loss of the magnetic steel 110 is aggravated, and the performance of the radial flux motor 10 is severely deteriorated.

In the radial flux motor 10 provided in this embodiment, the surface that is of the magnetic steel 110 and that is spaced from the slot wall of the magnetic steel slot 121 includes the plurality of primary grooves 111, and the plurality of primary grooves 111 divide the surface that is of the magnetic steel 110 and that is spaced from the slot wall of the magnetic steel slot 121 into a plurality of isolated regions, so that the eddy current is limited to a small region between two primary grooves 111 (as shown in FIG. 14), to effectively reduce a length of an eddy current loop of the magnetic steel 110. It may be understood that a short eddy current path can significantly reduce the eddy current loss of the magnetic steel 110. Correspondingly, in the radial flux motor 10 provided in this embodiment, the surface that is of the magnetic steel 110 and that is spaced from the slot wall of the magnetic steel slot 121 includes the plurality of primary grooves 111, so that the eddy current loss of the magnetic steel 110 can be reduced, to avoid a phenomenon such as heating and demagnetization of the magnetic steel 110 caused by the eddy current loss, and improve the performance of the radial flux motor 10.

In addition, it can be understood that the eddy current of the magnetic steel 110 is concentrated on the surface that is of the magnetic steel 110 and that is spaced from the slot wall of the magnetic steel slot 121. In addition, a larger quantity of grooves on the magnetic steel 110 indicates a larger size loss of the magnetic steel 110 and a larger magnetic performance loss of the magnetic steel 110. In the radial flux motor 10 provided in this embodiment, the surface that is of the magnetic steel 110 and that is spaced from the slot wall of the magnetic steel slot 121 includes the plurality of primary grooves 111, so that a relationship between reduction of the eddy current loss and reduction of the magnetic performance loss of the magnetic steel 110 can be considered. In this way, the eddy current loss of the magnetic steel 110 can be more effectively reduced, and impact on magnetic performance and material utilization of the magnetic steel 110 can be avoided.

In an implementation, the primary groove 111 is coated with an insulation material such as insulation adhesive and insulation paint, so that two groove walls of the primary groove 111 that are distributed in the axial direction A of the rotor 100 are insulated and isolated. In an implementation, the primary groove 111 may not be filled with an insulation material, and the two groove walls are insulated and isolated by using air.

In an embodiment, a surface of the magnetic steel 110 includes a plurality of side faces, at least one of the plurality of side faces is spaced from the slot wall of the magnetic steel slot 121, and the at least one side face includes a plurality of primary grooves 111.

As shown in FIG. 5b, the surface of the magnetic steel 110 includes a first side face 101, a second side face 102, a third side face 103, and a fourth side face 104 that are sequentially connected. The first side face 101 is disposed opposite to the third side face 103, and the second side face 102 is disposed opposite to the fourth side face 104. The first side face 101 of the magnetic steel 110 is spaced from the slot wall of the magnetic steel slot 121. The first side face 101 of the magnetic steel 110 includes a plurality of primary grooves 111.

For example, an arrangement direction of the first side face 101 and the third side face 103 is perpendicular to a magnetic pole arrangement direction of the magnetic steel 110, and an arrangement direction of the second side face 102 and the fourth side face 104 is parallel to the magnetic pole arrangement direction of the magnetic steel 110. The magnetic pole arrangement direction of the magnetic steel 110 is an arrangement direction of an N pole (such as a magnetic north pole) and an S pole (such as a magnetic south pole) of the magnetic steel 110. After the magnetic steel 110 is mounted in the magnetic steel slot 121, the first side face 101 is spaced from the slot wall of the magnetic steel slot 121. The first side face 101 of the magnetic steel 110 includes a plurality of primary grooves 111.

As shown in FIG. 6, the magnetic steel 110 includes a plurality of side faces disposed parallel to the axial direction A of the rotor 100. The plurality of side faces are sequentially disposed adjacent to each other in a circumferential direction C of the magnetic steel 110. The circumferential direction C of the magnetic steel 110 is a direction surrounding the length direction of the magnetic steel 110. The plurality of side faces do not include two side end faces of the magnetic steel 110 that are disposed opposite to each other in the axial direction A of the rotor 100. At least one of the plurality of side faces of the magnetic steel 110 is spaced from the slot wall of the magnetic steel slot 121, and the at least one side face includes a plurality of primary grooves 111.

In an implementation, the plurality of primary grooves 111 are arranged in the axial direction A, and all of the plurality of primary grooves 111 are parallel to each other (as shown in FIG. 6).

Figure 12:
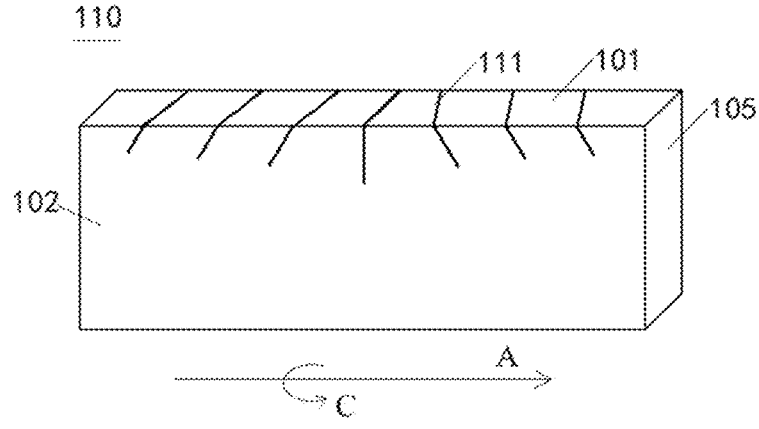
FIG. 12 is a schematic diagram of a magnetic steel according to an implementation.

In an implementation, the plurality of primary grooves 111 are arranged in the axial direction A, and extension lines of at least two primary grooves 111 intersect (as shown in FIG. 12).

Figure 8:
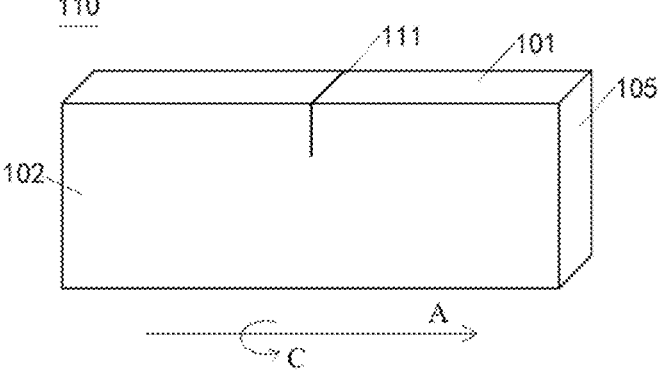
FIG. 8 is a schematic diagram of a magnetic steel according to an implementation.

In an implementation, the first side face 101 includes one primary groove 111, and the primary groove 111 is located at a middle position of the first side face 101 in the axial direction A of the rotor 100 (as shown in FIG. 8).

In an implementation, a length Lg of each of the plurality of primary grooves 111 is less than a width of the first side face 101 (as shown in FIG. 5a). In an implementation, a length Lg of each of the plurality of primary grooves 111 is greater than or equal to a width of the first side face 101 (as shown in FIG. 5b and FIG. 7). A longer length Lg of the primary groove 111 is more conducive to reducing the eddy current loss. The width of the first side face 101 is a distance between two side edges that are of the first side face 101 and that are respectively connected to the second side face 102 and the fourth side face 104. In an implementation, the second side face 102 is parallel to the fourth side face 104, and the width of the first side face 101 is a distance between the second side face 102 and the fourth side face 104.

In the radial flux motor 10 provided in this embodiment, the side face that is of the magnetic steel 110 and that is spaced from the slot wall of the magnetic steel slot 121 includes the plurality of primary grooves 111, and the plurality of primary grooves 111 divide the side face that is of the magnetic steel 110 and that is spaced from the slot wall of the magnetic steel slot 121 into a plurality of isolated regions. For example, a groove is disposed on the first side face 101. The first side face 101 is divided into a plurality of isolated regions by the plurality of primary grooves 111. Correspondingly, the eddy current is limited to a small region between two primary grooves 111, to effectively reduce a length of an eddy current loop of the magnetic steel 110. It may be understood that in the radial flux motor 10 provided in this embodiment, the side face that is of the magnetic steel 110 and that is spaced from the slot wall of the magnetic steel slot 121 includes the plurality of primary grooves 111, so that the eddy current loss of the magnetic steel 110 can be reduced, to avoid a phenomenon such as heating and demagnetization of the magnetic steel 110 caused by the eddy current loss, and improve the performance of the radial flux motor 10.

In addition, it may be understood that the eddy current of the magnetic steel 110 is concentrated on the side face that is of the magnetic steel 110 and that is spaced from the slot wall of the magnetic steel slot 121. In addition, a larger quantity of grooves on the magnetic steel 110 indicates a larger size loss of the magnetic steel 110 and a larger magnetic performance loss of the magnetic steel 110. In the radial flux motor 10 provided in this embodiment, the side face that is of the magnetic steel 110 and that is spaced from the slot wall of the magnetic steel slot 121 includes the plurality of primary grooves 111, so that a relationship between reduction of the eddy current loss and reduction of the magnetic performance loss of the magnetic steel 110 can be considered. In this way, the eddy current loss of the magnetic steel 110 can be more effectively reduced, and impact on magnetic performance and material utilization of the magnetic steel 110 can be avoided.

In an embodiment, a cross-sectional shape of the at least one magnetic steel 110 in a direction perpendicular to the length direction of the magnetic steel 110 is a rectangle, side faces corresponding to two short edges of the rectangle are spaced from the slot wall of the magnetic steel slot 121, and the side faces corresponding to the two short edges of the rectangle include a plurality of primary grooves 111. Two side faces of the magnetic steel 110 are spaced from the slot wall of the magnetic steel slot 121, and the two side faces spaced from the slot wall of the magnetic steel slot 121 are the side faces corresponding to the two short edges of the rectangle. It can be further understood that the eddy current loss of the magnetic steel 110 is concentrated on the side faces corresponding to the two short edges of the rectangle. Correspondingly, the side faces corresponding to the two short edges of the magnetic steel in the radial flux motor 10 provided in this embodiment include the plurality of primary grooves 111, so that the eddy current loss of the magnetic steel 110 can be more effectively reduced.

Figure 15:
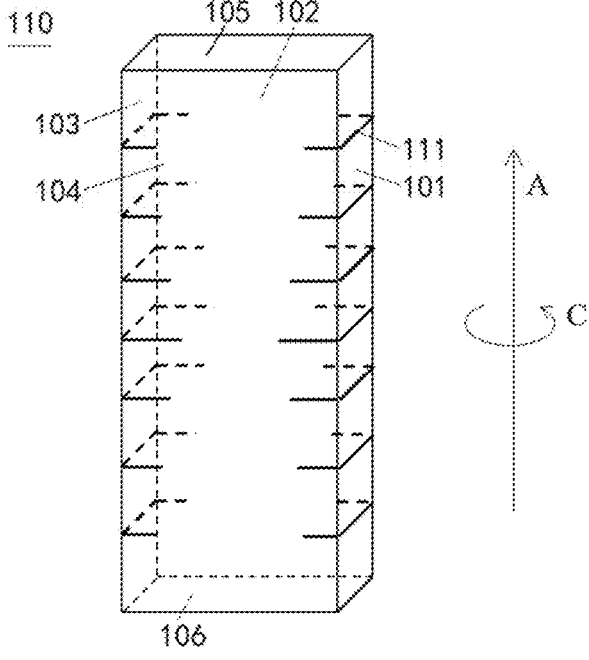
FIG. 15 is a schematic diagram of a magnetic steel according to an implementation.

In an embodiment, the plurality of side faces of the magnetic steel 110 that are disposed in the circumferential direction C of the magnetic steel 110 include two side faces having a smallest area, the two side faces having a smallest area are disposed opposite to each other, and at least one primary groove 111 is disposed on each of the two side faces having a smallest area. As shown in FIG. 15, for example, areas of a first side face 101 and a third side face 103 are equal, and the first side face 101 and the third side face 103 are two side faces having a smallest area in four side faces of the magnetic steel 110 that are disposed in the circumferential direction C. A quantity of primary grooves 111 on the first side face 101 may be equal to or different from a quantity of primary grooves 111 on the third side face 103.

The first side face 101 and the third side face 103 of the magnetic steel 110 in the radial flux motor 10 provided in this embodiment includes a plurality of primary grooves 111. In this way, the magnetic performance of the magnetic steel 110 can be retained to a maximum extent, and the eddy current loss of the magnetic steel 110 can be effectively reduced.

In an implementation, an arrangement direction of the two side faces that are of the magnetic steel 110 and that are spaced from the magnetic steel slot 121 intersects with an arrangement direction of a magnetic south pole and a magnetic north pole of the magnetic steel 110.

In an embodiment, an arrangement direction of the two side faces that have a smallest area, that are of the magnetic steel 110, and that are disposed in the circumferential direction C of the magnetic steel 110 intersects with an arrangement direction of a magnetic south pole and a magnetic north pole of the magnetic steel 110. The arrangement direction of the magnetic south pole and the magnetic north pole of the magnetic steel 110 is an arrangement direction of a second side face 102 and a fourth side face 104, and the arrangement direction of the two side faces having a smallest area is an arrangement direction of the first side face 101 and the third side face 103.

In an implementation, each of the two side faces having a smallest area includes a plurality of primary grooves 111 arranged in parallel in the axial direction A, and primary grooves 111 on the two side faces having a smallest area are parallel to each other. As shown in FIG. 15, for example, a plurality of primary grooves 111a arranged in the axial direction A are disposed on the first side face 101, the plurality of primary grooves 111a are parallel to each other, a plurality of primary grooves 111b arranged in the axial direction A are disposed on the third side face 103, the plurality of primary grooves 111b are parallel to each other, and the primary grooves 111a on the first side face 101 and the primary grooves lib on the third side face 103 are parallel to each other.

Figure 16:
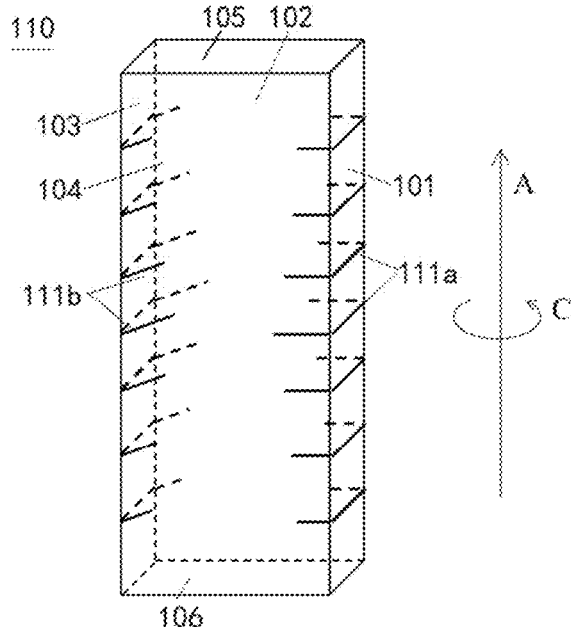
FIG. 16 is a schematic diagram of a magnetic steel according to an implementation.

In an implementation, each of the two side faces having a smallest area includes a plurality of primary grooves 111 arranged in parallel in the axial direction A, and primary grooves 111 located on different side faces intersect. As shown in FIG. 16, a plurality of primary grooves 111a arranged in the axial direction A are disposed on the first side face 101, the plurality of primary grooves 111a are parallel to each other, a plurality of primary grooves 111b arranged in the axial direction A are disposed on the third side face 103, the plurality of primary grooves 111b are parallel to each other, and the primary grooves 111a on the first side face 101 and the primary grooves 111b on the third side face 103 intersect.

In an implementation, a primary groove 111 on one side face having a smallest area is symmetrically disposed with a primary groove 111 on the other side face having a smallest area (as shown in FIG. 15). That is, the primary groove 111a on the first side face 101 is symmetrically disposed with the primary groove 1/1b on the third side face 103, and an orthographic projection of the primary groove 111a on the first side face 101 on the third side face 103 overlaps an orthographic projection of the primary groove 111b on the third side face 103 on the third side face, to facilitate processing.

Figure 17:
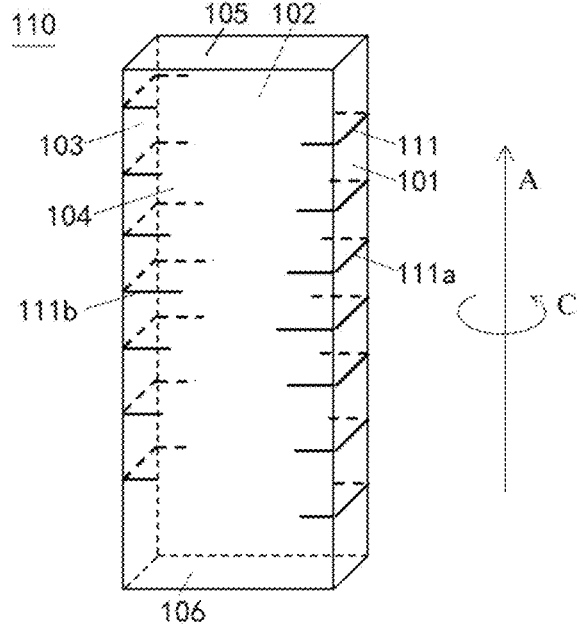
FIG. 17 is a schematic diagram of a magnetic steel according to an implementation.

In an implementation, a primary groove 111 on one side face having a smallest area is disposed in a staggered manner with a primary groove 111 on the other side face having a smallest area (as shown in FIG. 17). That is, the primary groove 111a on the first side face 101 is disposed in a staggered manner with the primary groove 111b on the third side face 103, and an orthographic projection of the primary groove 11a on the first side face 101 on the third side face 103 does not overlap an orthographic projection of the primary groove 111b on the third side face 103 on the third side face. This helps improve rigidity of the magnetic steel 110 after a groove is disposed, and when disposing is performed in the staggered manner, a primary groove 111 with a larger depth can be disposed.

In an implementation, the length of the magnetic steel 110 in the axial direction A of the rotor 100 is equal to or approximately equal to the length of the rotor core 120 in the axial direction A.

In an implementation, the radial flux motor 10 further includes the stator 300, the stator 300 is sleeved around the rotor 100, and the length of the magnetic steel 110 in the axial direction A of the rotor 100 is equal to or approximately equal to a length of the rotor 100 in the axial direction A.

In an implementation, the magnetic steel 110 may alternatively be tile-shaped, and the magnetic steel 110 may be attached to a circumferential surface of the rotor core 120, or the magnetic steel 110 is embedded into a circumferential surface of the rotor core 120.

In an embodiment, included angles between extension directions of the plurality of primary grooves 111 and the length direction of the magnetic steel 110 include one or more angle values. The one or more angle values include at least one of 90 degrees and a value less than 90 degrees. The extension direction of the primary groove 111 is a length Lg direction of the primary groove 111 (refer to FIG. 7). The included angles between the extension directions of the plurality of primary grooves 111 and the length direction of the magnetic steel 110 help dispose the primary groove 111 on the magnetic steel 110. The included angles between the extension directions of the plurality of primary grooves 111 and the length direction of the magnetic steel 110 are set in a diversified manner, so that when the magnetic steel 110 is mounted on different types of radial flux motors 10, the eddy current loss of the magnetic steel 110 can be well reduced.

In an implementation, the included angles between the extension directions of the plurality of primary grooves 111 and the length direction of the magnetic steel 110 include one angle value. The one angle value includes at least one of 90 degrees and a value less than 90 degrees. The plurality of primary grooves 111 are parallel to each other, angle values of the included angles between the extension directions of the plurality of primary grooves 111 and the length direction of the magnetic steel 110 are the same, and the included angles between the extension directions of the plurality of primary grooves 111 and the length direction of the magnetic steel 110 are 90 degrees or less than 90 degrees.

Figure 10:
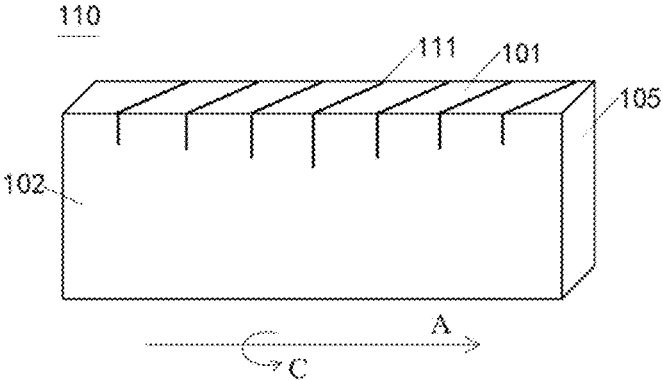
FIG. 10 is a schematic diagram of a magnetic steel according to an implementation.

In an implementation, the included angles between the extension directions of the plurality of primary grooves 111 and the length direction of the magnetic steel 110 include one angle value. The extension directions of the plurality of primary grooves 111 intersect with the length direction of the magnetic steel 110 (as shown in FIG. 10), and the included angles between the extension directions of the plurality of primary grooves 111 and the length direction of the magnetic steel 110 may be one of 5, 10, 15, 20, 25, 30, 35, 40, 45, 50, 55, 60, 65, 70, 75, 80, 85, and 90 degrees.

In an implementation, the included angles between the extension directions of the plurality of primary grooves 111 and the length direction of the magnetic steel 110 include a plurality of angle values. In an implementation, angle values of included angles between some primary grooves 111 and the length direction of the magnetic steel 110 are 90 degrees, and angle values of included angles between the other primary grooves 111 and the length direction of the magnetic steel 110 are less than 90 degrees. In an implementation, the included angles between the extension directions of the plurality of primary grooves 111 and the length direction of the magnetic steel 110 include a plurality of angle values, and all of the angle values of the included angles between the plurality of primary grooves 111 and the length direction of the magnetic steel 110 are less than 90 degrees.

In an implementation, the included angles between the extension directions of the plurality of primary grooves 111 and the length direction of the magnetic steel 110 include a plurality of angle values. The included angles between the extension directions of the plurality of primary grooves 111 and the length direction of the magnetic steel 110 may be at least two of 5, 10, 15, 20, 25, 30, 35, 40, 45, 50, 55, 60, 65, 70, 75, 80, 85, and 90 degrees.

Figure 11:
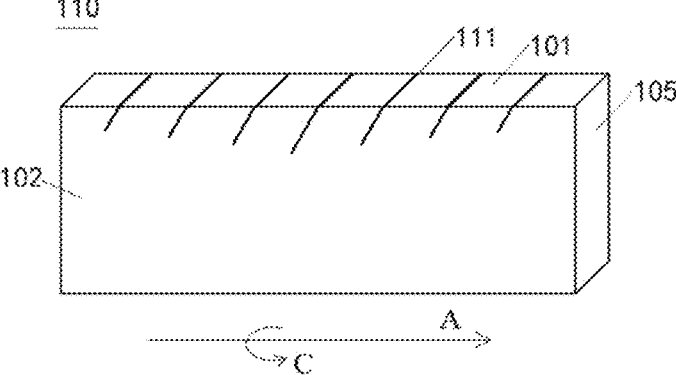
FIG. 11 is a schematic diagram of a magnetic steel according to an implementation.

In an implementation, a plane on which a groove wall of the primary groove 111 is located intersects with the axial direction A of the rotor 100 (as shown in FIG. 11), and an included angle between the plane on which the groove wall of the primary groove 111 is located and the axial direction A may be 5, 10, 15, 20, 25, 30, 35, 40, 45, 50, 55, 60, 65, 70, 75, 80, or 85 degrees. The plane on which the groove wall of the primary groove 111 is located is a plane on which the length Lg and a depth Dg of the primary groove 111 are located (refer to FIG. 7).

In an implementation, a plane on which a groove wall of the primary groove 111 is located is perpendicular to the axial direction A of the rotor 100 (as shown in FIG. 6).

In an embodiment, at least one of groove spacings between or groove depths of the plurality of primary grooves 111 includes at least two values. The groove spacing is a distance between two adjacent primary grooves 111, and the groove depth is a distance between a groove opening and a groove bottom of the primary groove 111.

It can be further understood that in the magnetic steel 110, there is a region with high eddy current loss distribution density and a region with low eddy current loss distribution density. In an embodiment, in the radial flux motor 10, a groove spacing between primary grooves 111, of the magnetic steel 110, located in the region with high eddy current loss distribution density may be set to be less than a groove spacing between primary grooves 111 located in the region with low eddy current loss distribution density, so that the eddy current loss of the magnetic steel 110 can be more effectively reduced. In an embodiment, in the radial flux motor 10, a groove depth of a primary groove 111, of the magnetic steel 110, located in the region with high eddy current loss distribution density may be set to be greater than a groove depth of a primary groove 111 located in the region with low eddy current loss distribution density, so that after the primary groove 111 is disposed on the magnetic steel 110, the eddy current loss of the magnetic steel 110 can be more effectively reduced.

In an implementation, the groove spacings between the plurality of primary grooves 111 include at least two values, and the groove depths of the plurality of primary grooves 111 include one value.

In an implementation, the groove depths of the plurality of primary grooves 111 include at least two values, and the groove spacings between the plurality of primary grooves 111 include one value.

In an implementation, the groove spacings between the plurality of primary grooves 111 include at least two values, and the groove depths of the plurality of primary grooves 111 include at least two values.

Figure 9:
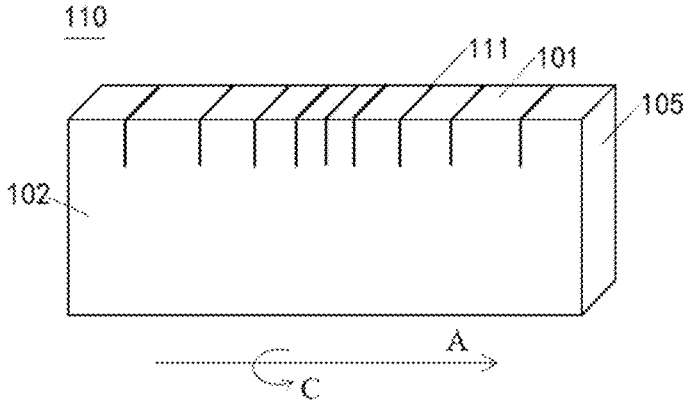
FIG. 9 is a schematic diagram of a magnetic steel according to an implementation.

In an implementation, the first side face 101 of the magnetic steel 110 includes a plurality of primary grooves 111, and the plurality of primary grooves 111 are unevenly distributed on the first side face 101 in the axial direction A of the rotor 100. Uneven distribution means that depths of or spacings between the primary grooves 111 are unevenly distributed. For example, depths of two adjacent primary grooves 111 are different (as shown in FIG. 6), or spacings between two adjacent primary grooves 111 in three consecutively distributed primary grooves 111 are different (as shown in FIG. 9).

Figure 19:
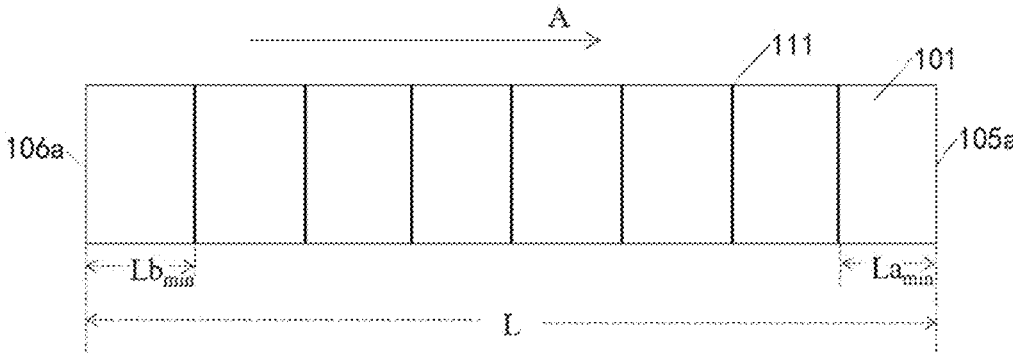
FIG. 19 is a schematic diagram of a first side face according to an implementation.

Refer to FIG. 19. In an embodiment, in the length direction of the magnetic steel, a distance between any primary groove 111 and any end of the magnetic steel 110 is greater than or equal to ⅙ of the length of the magnetic steel 110. Additionally, it can be understood that eddy current loss density on the magnetic steel 110 is related to the length of the magnetic steel 110. Eddy current loss density at a middle position of the magnetic steel 110 is higher than that at two ends of the magnetic steel 110 in the length direction of the magnetic steel.

In the radial flux motor 10 provided in this embodiment, the plurality of primary grooves 111 on the magnetic steel 110 are disposed close to a middle of the first side face 101 in the length direction of the magnetic steel, so that a length of an eddy current loop generated in the magnetic steel 110 can be more effectively reduced, the eddy current loss of the magnetic steel 110 can be significantly reduced, and a performance indicator of the radial flux motor 10 can be improved.

Refer to FIG. 19. In an embodiment, in the length direction of the magnetic steel, a minimum distance between each of the plurality of primary grooves 111 and each of two ends of the magnetic steel 110 is greater than or equal to ⅙ of the length of the magnetic steel 110. For example, a distance between each primary groove 111 and one end of the magnetic steel 110 in the length direction of the magnetic steel is greater than or equal to $\frac{1}{6}$ of the length of the magnetic steel 110, and a distance between each primary groove 111 and the other end of the magnetic steel 110 in the length direction of the magnetic steel is greater than or equal to $\frac{1}{6}$ of the length of the magnetic steel 110.

In an implementation, the first side face 101 of the magnetic steel 110 includes a first groove region. The magnetic steel 110 includes a first end 105a and a second end 106a that are disposed opposite to each other in the length direction of the magnetic steel. A distance between the first end 105a and a side that is of the first groove region and that is close to the first end 105a in the length direction of the magnetic steel is $\frac{1}{6}$L. A distance between the second end 106a and a side that is of the first groove region and that is close to the second end 106a in the length direction of the magnetic steel is also $\frac{1}{6}$L. Herein, L is the length of the magnetic steel 110 in the axial direction of the rotor 100. The first groove region on the first side face 101 of the magnetic steel 110 includes a plurality of primary grooves 111, and a minimum distance between at least one primary groove 111 and each of the two ends of the magnetic steel 110 is greater than or equal to $\frac{1}{6}$ of the length of the magnetic steel 110.

In an implementation, the first side face 101 of the magnetic steel 110 includes one primary groove 111. In the length direction of the magnetic steel, a distance between the primary groove 111 and any end of the magnetic steel 110 is greater than or equal to $\frac{1}{6}$ of the length of the magnetic steel 110, and is less than or equal to $\frac{1}{2}$ of the length of the magnetic steel 110.

In an implementation, the first side face 101 of the magnetic steel 110 includes a plurality of primary grooves 111. In the length direction of the magnetic steel, a distance between any primary groove 111 in the plurality of primary grooves 111 and any end of the magnetic steel 110 is greater than or equal to $\frac{1}{6}$ of the length of the magnetic steel 110, and is less than or equal to $\frac{1}{2}$ of the length of the magnetic steel 110.

In an implementation, the first side face 101 of the magnetic steel 110 includes a plurality of primary grooves 111. In the length direction of the magnetic steel, a length of the plurality of primary grooves 111 is less than or equal to $\frac{2}{3}$. The length of the plurality of primary grooves 111 in the length direction of the magnetic steel is a distance between two primary grooves 111 closest to two ends in the length direction of the magnetic steel.

In an embodiment, the first side face 101 of the magnetic steel 110 includes a plurality of primary grooves 111. In the length direction of the magnetic steel, a distance between any primary groove 111 and any end of the magnetic steel 110 is greater than or equal to $\frac{3}{8}$ of the length of the magnetic steel 110.

In an embodiment, the first side face 101 of the magnetic steel 110 includes a plurality of primary grooves 111. In the length direction of the magnetic steel, a minimum distance between each of the plurality of primary grooves 111 and each of two ends of the magnetic steel 110 is greater than or equal to $\frac{3}{8}$ of the length of the magnetic steel 110.

Further, it can be understood that eddy current loss density on the magnetic steel 110 is related to the length of the magnetic steel 110. Eddy current loss density at a middle position of the magnetic steel 110 is higher than that at two ends of the magnetic steel 110 in the axial direction A. In the radial flux motor 10 provided in this embodiment, the plurality of primary grooves 111 on the magnetic steel 110 are disposed close to a middle of the first side face 101 in the length direction of the magnetic steel, so that a length of an eddy current loop generated in the magnetic steel 110 can be more effectively reduced, the eddy current loss of magnetic steel 110 can be significantly reduced, and a performance indicator of the radial flux motor 10 can be improved.

In an implementation, the first side face 101 of the magnetic steel 110 includes a second groove region. A distance between a first end 105a and a side that is of the second groove region and that is close to the first end 105a in the length direction of the magnetic steel is $\frac{3}{8}$L. A distance between a second end 106a and a side that is of the second groove region and that is close to the second end 106a in the length direction of the magnetic steel is also $\frac{3}{8}$L. Herein, L is the length of the magnetic steel 110 in the axial direction A of the rotor 100. The second groove region on the first side face 101 of the magnetic steel 110 includes a plurality of primary grooves 111, and a minimum distance between at least one primary groove 111 and each of the two ends of the magnetic steel 110 is greater than or equal to $\frac{3}{8}$ of the length of the magnetic steel 110.

In an implementation, the first side face 101 of the magnetic steel 110 includes one primary groove 111. In the length direction of the magnetic steel, a distance between the primary groove 111 and any end of the magnetic steel 110 is greater than or equal to $\frac{3}{8}$ of the length of the magnetic steel 110, and is less than or equal to $\frac{1}{2}$ of the length of the magnetic steel 110.

In an implementation, the first side face 101 of the magnetic steel 110 includes a plurality of primary grooves 111. In the length direction of the magnetic steel, a distance between any primary groove 111 and any end of the magnetic steel 110 is greater than or equal to $\frac{3}{8}$ of the length of the magnetic steel 110, and is less than $\frac{1}{2}$ of the length of the magnetic steel 110. In an implementation, in the length direction of the magnetic steel, a distance between any primary groove 111 and any end of the magnetic steel 110 is greater than or equal to $\frac{1}{4}$ of the length of the magnetic steel 110. In an implementation, in the length direction of the magnetic steel, a distance between any primary groove 111 and any end of the magnetic steel 110 is greater than or equal to $\frac{1}{3}$ of the length of the magnetic steel 110. In an implementation, a length of the plurality of primary grooves 111 in the length direction of the magnetic steel is less than or equal to $\frac{1}{4}$. The length of the plurality of primary grooves 111 in the length direction of the magnetic steel is a distance between two primary grooves 111 that are respectively located at two ends closest to the magnetic steel 110 in the axial direction A. In an implementation, in the length direction of the magnetic steel, a length of the plurality of primary grooves 111 is greater than or equal to $\frac{1}{4}$, and is less than or equal to $\frac{2}{3}$.

In an embodiment, the first side face 101 of the magnetic steel 110 includes a plurality of primary grooves 111. The magnetic steel 110 includes a first end 105a and a second end 106a that are disposed opposite to each other in the length direction of the magnetic steel. A minimum distance between the plurality of primary grooves 111 and the first end 105a is equal to a minimum distance between at least one primary groove 111 and the second end 106a. The minimum distance between the plurality of primary grooves 111 and the first end 105a is $La_{min}$ (refer to FIG. 19), a minimum distance between the plurality of primary grooves 111 and the second end 106a is $Lb_{min}$, and $La_{min}$ is equal to $Lb_{min}$. The first side face 101 of the magnetic steel 110 in the radial flux motor 10 provided in this embodiment includes the plurality of primary grooves 111 at a middle position in the length direction of the magnetic steel, so that a length of an eddy current loop generated in the magnetic steel 110 can be more effectively reduced, the eddy current loss of the magnetic steel 110 can be significantly reduced, and a performance indicator of the radial flux motor 10 can be improved.

In an embodiment, the first side face 101 of the magnetic steel 110 includes a plurality of primary grooves 111. A largest depth Dg of the plurality of primary grooves 111 is greater than or equal to $\frac{1}{10}$ of a width W of the magnetic steel 110 in a depth Dg direction of the primary groove 111 (refer to FIG. 6), and is less than or equal to $\frac{1}{3}$ of the width of the magnetic steel 110 in the depth Dg direction of the primary groove 111. For example, the depth Dg direction of the primary groove 111 is a first direction X in FIG. 6.

In an implementation, the depth Dg direction of the primary groove 111 is also the arrangement direction of the first side face 101 and the third side face 103, and the width W of the magnetic steel 110 is a spacing between the first side face 101 and the third side face 103. It can be further understood that the eddy current of the magnetic steel 110 is located on the first side face 101, and extends towards the third side face 103, the eddy current has a specific depth, and the depth is related to the width W of the magnetic steel 110. A depth Dg of at least one primary groove 111 on the first side face 101 of the magnetic steel 110 in the radial flux motor 10 provided in this embodiment is between $\frac{1}{10}$ and $\frac{1}{3}$ of the width W of the magnetic steel 110, so that an eddy current path in the magnetic steel 110 can be more effectively damaged, a length of an eddy current loop generated in the magnetic steel 110 can be reduced, the eddy current loss of the magnetic steel 110 can be significantly reduced, and a performance indicator of the radial flux motor 10 can be improved.

In an implementation, a primary groove 111 with a largest depth Dg in the plurality of primary grooves 111 is located at a middle position of the plurality of primary grooves 111 in the axial direction A.

In an implementation, in the axial direction A, a distance between the primary groove 111 with a largest depth Dg in the plurality of primary grooves 111 and each of the two ends of the magnetic steel 110 is half of the length of the magnetic steel 110.

In an implementation, the largest depth Dg of the plurality of primary grooves 111 is greater than or equal to $\frac{1}{6}$ of the width W of the magnetic steel 110 in the first direction X, and is less than or equal to $\frac{1}{3}$ of the width W of the magnetic steel 110 in the first direction.

In an implementation, the largest depth Dg of the plurality of primary grooves 111 is greater than or equal to $\frac{1}{5}$ of the width W of the magnetic steel 110 in the first direction X, and is less than or equal to $\frac{1}{3}$ of the width W of the magnetic steel 110 in the first direction.

In an implementation, the largest depth Dg of the plurality of primary grooves 111 is greater than or equal to $\frac{3}{10}$ of the width W of the magnetic steel 110 in the first direction X, and is less than or equal to $\frac{1}{3}$ of the width W of the magnetic steel 110 in the first direction.

In an implementation, the largest depth Dg of the plurality of primary grooves 111 is greater than or equal to $\frac{1}{6}$ of the width W of the magnetic steel 110 in the first direction X, and is less than or equal to $\frac{3}{10}$ of the width W of the magnetic steel 110 in the first direction.

In an implementation, the largest depth Dg of the plurality of primary grooves 111 is greater than or equal to $\frac{1}{10}$ of the width W of the magnetic steel 110 in the first direction X, and is less than or equal to $\frac{1}{5}$ of the width W of the magnetic steel 110 in the first direction.

In an embodiment, a value of a spacing between two adjacent primary grooves 111 in the plurality of primary grooves 111 is greater than or equal to 0.5 millimeter, and is less than or equal to 500 millimeters. A spacing between any two adjacent primary grooves 111 ranges from 0.5 millimeter to 500 millimeters. The spacing between two adjacent primary grooves 111 in the plurality of primary grooves 111 is set based on the length of the magnetic steel 110 and eddy current loss density on the magnetic steel 110, to effectively reduce the eddy current loss of the magnetic steel 110, and reduce a magnetic performance loss of the magnetic steel 110, so as to improve a performance indicator of the radial flux motor 10.

In an implementation, a value of the spacing between two adjacent primary grooves 111 in the plurality of primary grooves 111 is greater than or equal to 0.5 millimeter, and is less than or equal to 100 millimeters.

In an implementation, a value of the spacing between two adjacent primary grooves 111 in the plurality of primary grooves 111 is greater than or equal to 0.5 millimeter, and is less than or equal to 50 millimeters.

In an implementation, a value of the spacing between two adjacent primary grooves 111 in the plurality of primary grooves 111 is greater than or equal to 1 millimeter, and is less than or equal to 25 millimeters.

In an implementation, a value of the spacing between two adjacent primary grooves 111 in the plurality of primary grooves 111 is greater than or equal to 5 millimeters, and is less than or equal to 30 millimeters.

In an implementation, a value of the spacing between two adjacent primary grooves 111 in the plurality of primary grooves 111 is greater than or equal to 10-35 millimeters.

In an implementation, a value of the spacing between two adjacent primary grooves 111 in the plurality of primary grooves 111 is greater than or equal to 15-40 millimeters.

In an implementation, a value of the spacing between two adjacent primary grooves 111 in the plurality of primary grooves 111 is greater than or equal to 20-45 millimeters.

In an implementation, a value of the spacing between two adjacent primary grooves 111 in the plurality of primary grooves 111 is greater than or equal to 25-50 millimeters.

In an implementation, a value of the spacing between two adjacent primary grooves 111 in the plurality of primary grooves 111 is greater than or equal to 20-80 millimeters.

In an implementation, a value of the spacing between two adjacent primary grooves 111 in the plurality of primary grooves 111 is greater than or equal to 100 millimeters, and is less than or equal to 200 millimeters.

In an implementation, a value of the spacing between two adjacent primary grooves 111 in the plurality of primary grooves 111 is greater than or equal to 200 millimeters, and is less than or equal to 400 millimeters.

In an implementation, a value of the spacing between two adjacent primary grooves 111 in the plurality of primary grooves 111 is greater than or equal to 300 millimeters, and is less than or equal to 500 millimeters.

In an embodiment, a value of a width Wg of the primary groove 111 in the length direction of the magnetic steel 110 is greater than or equal to 0.01 millimeter, and is less than or equal to 1 millimeter (refer to FIG. 7). The width Wg of the primary groove 111 in the length direction of the magnetic steel 110 is a distance between two groove walls of the primary groove 111 in the axial direction A. A width Wg of each primary groove 111 on the magnetic steel 110 ranges from 0.01 millimeter to 1 millimeter.

The width Wg of the primary groove 111 is set to be less than or equal to 1 millimeter. The width Wg of the primary groove 111 is set to be small, so that after a groove is disposed, a size loss of the magnetic steel 110 is small, and the magnetic performance of the magnetic steel 110 can be well retained. The width Wg of the primary groove 111 is set to be greater than or equal to 0.01 millimeter, so that the primary groove 111 has good isolation performance, and an eddy current path can be cut off to reduce the eddy current loss.

In an implementation, the value of the width Wg of the primary groove 111 in the length direction of the magnetic steel 110 is greater than or equal to 0.05 millimeter, and is less than or equal to 0.5 millimeter.

In an implementation, the value of the width Wg of the primary groove 111 in the length direction of the magnetic steel 110 is greater than or equal to 0.1 millimeter, and is less than or equal to 0.6 millimeter.

In an implementation, the value of the width Wg of the primary groove 111 in the length direction of the magnetic steel 110 is greater than or equal to 0.2 millimeter, and is less than or equal to 0.7 millimeter.

In an implementation, the value of the width Wg of the primary groove 111 in the length direction of the magnetic steel 110 is greater than or equal to 0.3 millimeter, and is less than or equal to 0.8 millimeter.

In an implementation, the value of the width Wg of the primary groove 111 in the length direction of the magnetic steel 110 is greater than or equal to 0.4 millimeter, and is less than or equal to 0.9 millimeter.

In an implementation, the value of the width Wg of the primary groove 111 in the length direction of the magnetic steel 110 is greater than or equal to 0.5 millimeter, and is less than or equal to 1 millimeter.

In an embodiment, in the length direction of the magnetic steel 110, the depths of the plurality of primary grooves 111 are first increased and then decreased (as shown in FIG. 6).

Figure 20:
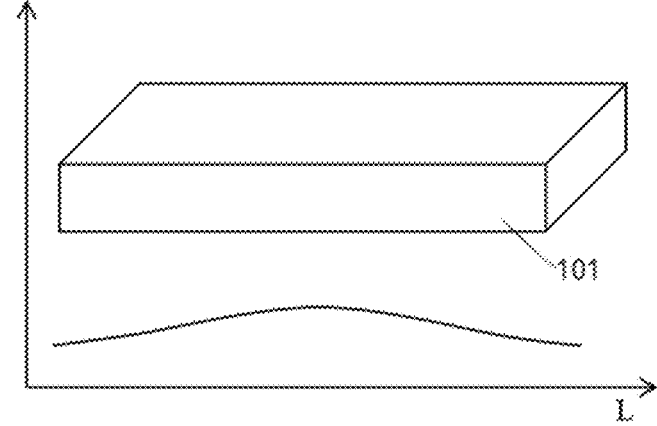
FIG. 20 is a diagram of distribution of eddy current loss density on a first side face of a magnetic steel on which no primary groove is disposed.

FIG. 20 is a diagram of distribution of eddy current loss density on the first side face 101 of the magnetic steel 110 on which no primary groove 111 is disposed. For example, a horizontal coordinate corresponds to the length L of the magnetic steel 110 in the axial direction A, and a vertical coordinate represents an eddy current loss. In the length direction of the magnetic steel 110, the eddy current loss density is first increased and then decreased, and a change shape of the eddy current loss density is similar to a sine function. Based on an eddy current loss distribution rule of the magnetic steel, the first side face 101 of the magnetic steel 110 in the radial flux motor 10 provided in the embodiments includes a plurality of primary grooves 111, and depths of the plurality of primary grooves 111 are also set in an approximate sine function in the axial direction A (as shown in FIG. 6). The groove depth of the primary groove 111 on the magnetic steel 110 is positively correlated with the eddy current loss density on the magnetic steel 110. At a corresponding position at which the eddy current loss of the magnetic steel 110 is larger, a larger depth of the primary groove 111 is set, so that for the magnetic steel 110 on which the primary groove 111 is disposed, the eddy current loss of the magnetic steel 110 can be reduced, and the magnetic performance of the magnetic steel 110 can be retained to a maximum extent.

In an implementation, in the length direction of the magnetic steel 110, a longer minimum distance between the primary groove 111 and each of the two ends of the magnetic steel 110 indicates a larger depth of the primary groove 111.

In an embodiment, the plurality of primary grooves 111 are distributed at equal intervals in the length direction of the magnetic steel 110, and the depths of the plurality of primary grooves 111 are first increased and then decreased in the length direction of the magnetic steel 110 (as shown in FIG. 6).

In a possible implementation, in the length direction of the magnetic steel 110, spacings between two adjacent primary grooves 111 in the plurality of primary grooves 111 are first decreased and then increased.

Based on the eddy current loss distribution rule of the magnetic steel, in the embodiments, a plurality of primary grooves 111 are disposed on the first side face 101 of the magnetic steel 110, and density of the plurality of primary grooves 111 is also set in an approximate sine function in the length direction of the magnetic steel 110. The groove density of the primary groove 111 on the magnetic steel 110 is positively correlated with the eddy current loss density on the magnetic steel 110. At a corresponding position at which the eddy current loss of the magnetic steel 110 is larger, a spacing between two adjacent primary grooves 111 is smaller, that is, distribution density of the primary groove 111 on the magnetic steel 110 is higher, so that for the magnetic steel 110 after groove cutting, the eddy current loss of the magnetic steel 110 can be reduced, and the magnetic performance of the magnetic steel 110 can be retained to a maximum extent.

In an implementation, in the length direction of the magnetic steel 110, there is higher distribution density of the primary groove 111 at a part with a longer minimum distance from each of the two ends of the magnetic steel 110.

In an embodiment, the depths of the plurality of primary grooves 111 are equal (as shown in FIG. 9), and in the length direction of the magnetic steel 110, spacings between two adjacent primary grooves 111 in the plurality of primary grooves 111 are first decreased and then increased.

Figure 21:
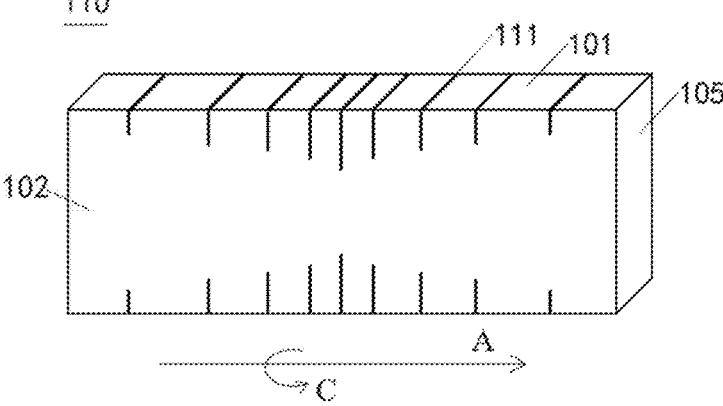
FIG. 21 is a schematic diagram of a magnetic steel according to an implementation.

Refer to FIG. 21. In a possible implementation, in the length direction of the magnetic steel 110, the depths of the plurality of primary grooves 111 are first increased and then decreased, and spacings between two adjacent primary grooves 111 in the plurality of primary grooves 111 are first decreased and then increased.

Based on an eddy current loss distribution rule of the magnetic steel 110, the first side face 101 of the magnetic steel 110 in the radial flux motor 10 provided in the embodiments includes a plurality of primary grooves 111, depths of the plurality of primary grooves 111 are set in an approximate sine function in the length direction of the magnetic steel 110, and density of the plurality of primary grooves 111 are set in an approximate sine function in the length direction of the magnetic steel 110, to effectively reduce the eddy current loss of the magnetic steel 110, and retain the magnetic performance of the magnetic steel 110 to a maximum extent.

In an implementation, in the length direction of the magnetic steel 110, a longer minimum distance between the primary groove 111 and each of the two ends of the magnetic steel 110 indicates a larger depth of the primary groove 111, and there is higher distribution density of the primary groove 111 at a part with a longer minimum distance from each of the two ends of the magnetic steel 110.

Figure 22:
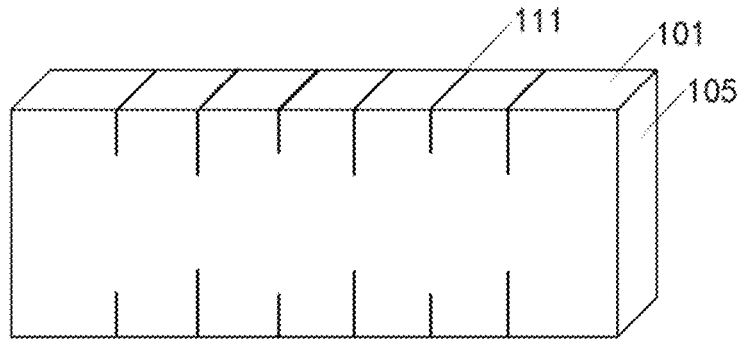
FIG. 22 is a schematic diagram of a magnetic steel according to an implementation.

Refer to FIG. 22. In a possible implementation, the plurality of primary grooves 111 include a plurality of first primary grooves 1111 and a plurality of second primary grooves 1112. In the length direction of the magnetic steel 110, the plurality of first primary grooves 1111 and the plurality of second primary grooves 1112 are sequentially alternately disposed, and a depth of the first primary groove 1111 is different from a depth of the second primary groove 1112.

That the plurality of first primary grooves 1111 and the plurality of second primary grooves 1112 are sequentially alternately disposed means that in the length direction of the magnetic steel 110, the first primary groove 1111, the second primary groove 1112, the first primary groove 1111, and the second primary groove 1112 are sequentially repeatedly arranged based on this rule, or the first primary groove 1111, the first primary groove 1111, the second primary groove 1112, the first primary groove 1111, the first primary groove 1111, and the second primary groove 1112 may be sequentially repeatedly arranged based on this rule, that is, n first primary grooves 1111, m second primary grooves 1112, n first primary grooves 1111, and m second primary grooves 1112 are sequentially repeatedly arranged based on this rule. Herein, n and m are positive integers.

When an environment in which the magnetic steel 110 is located is changed, eddy current distribution density on the magnetic steel 110 on which no primary groove 111 is disposed is changed. In the embodiments, it is set that the depth and a distribution manner of the primary groove 111 on the magnetic steel 110 on which the primary groove 111 is disposed are also accordingly changed, so that the eddy current loss of the magnetic steel 110 is smaller.

Figure 23:
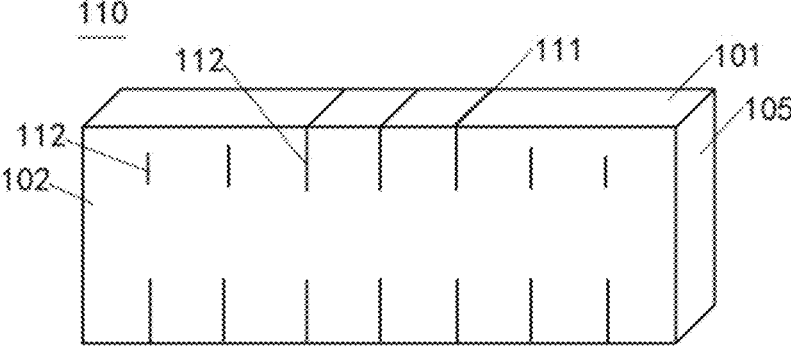
FIG. 23 is a schematic diagram of a magnetic steel according to an implementation.

Refer to FIG. 23. At least one side face of the magnetic steel 110 in the radial flux motor 10 provided in this embodiment includes a plurality of primary grooves 111, and at least one adjacent side face of the side face on which the plurality of primary grooves 111 are located includes a plurality of secondary grooves 112. For example, the plurality of primary grooves 111 are located on the first side face 101, and the secondary grooves 112 are located on the second side face 102 or the fourth side face 104. The secondary groove 112 is disposed, to more effectively reduce the eddy current loss of the magnetic steel 110.

In an embodiment, at least one adjacent side face of the side face that is of the magnetic steel 110 and on which the plurality of primary grooves 111 are located includes a plurality of secondary grooves 112, and at least one secondary groove 112 communicates with one primary groove 111. In an implementation, all of the secondary grooves 112 communicate with the primary groove 111. In an implementation, some secondary grooves 112 communicate with the primary groove 111, and some secondary grooves 112 do not communicate with the primary groove 111.

In an embodiment, at least one of groove spacings between or groove depths of the plurality of secondary grooves 112 includes at least two values. The groove spacing between the secondary grooves 112 is a distance between two adjacent secondary grooves 112, and the groove depth of the secondary groove 112 is a distance between a groove opening and a groove bottom of the secondary groove 112. Values of the groove spacings between and the groove depths of the plurality of secondary grooves 112 may be set based on the distribution of the eddy current loss of the magnetic steel 110. At a corresponding position at which the eddy current loss of the magnetic steel 110 is large, a groove spacing between the secondary grooves 112 on the magnetic steel 110 after groove cutting may be set to be small, or a groove depth of the secondary groove 112 may be set to be larger, to more effectively reduce the eddy current loss of the magnetic steel 110.

In an implementation, the groove spacings between the plurality of secondary grooves 112 include at least two values.

In an implementation, the groove depths of the plurality of secondary grooves 112 include at least two values.

In an implementation, each of the groove spacings between and the groove depths of the plurality of secondary grooves 112 includes at least two values.

In an embodiment, an angle value of an included angle between an extension direction of one or more consecutive secondary grooves 112 in the plurality of secondary grooves 112 and the length direction of the magnetic steel 110 is 90 degrees, and an angle value of an included angle between an extension direction of one or more other consecutive secondary grooves in the plurality of secondary grooves 112 and the length direction of the magnetic steel 110 is less than 90 degrees. The extension direction of the secondary groove 112 intersects with the length direction of the magnetic steel 110, to help dispose the groove on the magnetic steel 110. Included angles between extension directions of the plurality of secondary grooves 112 and the length direction of the magnetic steel 110 are set in a diversified manner, so that when the magnetic steel 110 is mounted on different types of radial flux motors 10, the eddy current loss of the magnetic steel 110 can be well reduced.

In an implementation, an angle value of an included angle between an extension direction of one or more secondary grooves 112 in the plurality of secondary grooves 112 and the length direction of the magnetic steel 110 is 90 degrees, and an angle value of an included angle between an extension direction of one or more other secondary grooves 112 in the plurality of secondary grooves 112 and the length direction of the magnetic steel 110 is less than 90 degrees.

In an implementation, angle values of included angles between extension directions of a plurality of consecutive secondary grooves 112 in the plurality of secondary grooves 112 and the length direction of the magnetic steel 110 are 90 degrees, and angle values of included angles between extension directions of a plurality of other secondary grooves 112 in the plurality of secondary grooves 112 and the length direction of the magnetic steel 110 are less than 90 degrees.

In an implementation, an angle value of an included angle between an extension direction of each of the plurality of secondary grooves 112 and the length direction of the magnetic steel 110 is 90 degrees, to help dispose the secondary groove 112 on the magnetic steel 110.

In an implementation, extension directions of the plurality of secondary grooves 112 are parallel to each other, and angle values of included angles between the extension directions of the plurality of secondary grooves 112 and the length direction of the magnetic steel 110 are less than 90 degrees. The included angles between the extension directions of the plurality of secondary grooves 112 and the length direction of the magnetic steel 110 may be one of 5, 10, 15, 20, 25, 30, 35, 40, 45, 50, 55, 60, 65, 70, 75, 80, and 85 degrees. This setting helps dispose the secondary groove 112 on the magnetic steel 110.

In an embodiment, a surface that is of the at least one magnetic steel 110 and that is in contact with the slot wall of the magnetic steel slot 121 includes a plurality of secondary grooves 112, and the plurality of secondary grooves 112 are sequentially arranged at intervals in the length direction of the magnetic steel 110. The magnetic steel 110 has four side faces. Two side faces are in contact with the slot wall of the magnetic steel slot 121, and the other two side faces are spaced from the slot wall of the magnetic steel slot 121. The primary groove 111 is disposed on the side face that is of the magnetic steel 110 and that is in contact with the slot wall of the magnetic steel slot 121, and the secondary groove 112 is disposed on the side face that is of the magnetic steel 110 and that is spaced from the slot wall of the magnetic steel slot 121. The secondary groove 112 is disposed, to more effectively reduce the eddy current loss of the magnetic steel 110.

Figure 18:
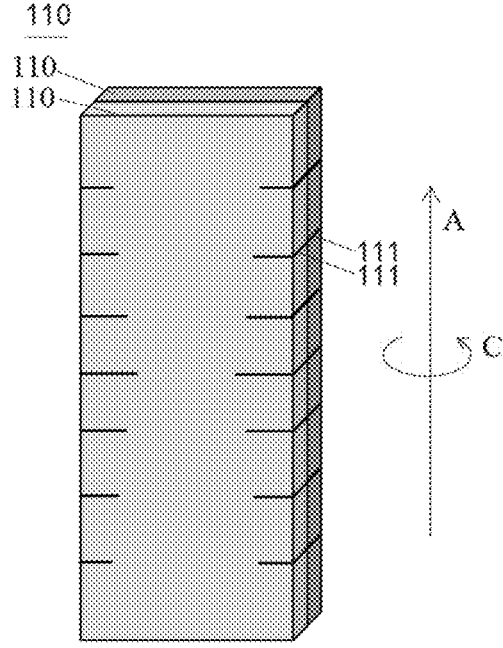
FIG. 18 is a schematic diagram of a magnetic steel according to an implementation.

In an embodiment, each magnetic steel slot 121 includes a plurality of magnetic steels 110 that are sequentially arranged adjacent to each other, and at least one primary groove 111 on one magnetic steel 110 in two adjacent magnetic steels 110 communicates with at least one primary groove 111 on the other magnetic steel 110 (as shown in FIG. 18). In an implementation, one magnetic steel slot 121 includes two magnetic steels 110. The two magnetic steels 110 are disposed side by side in an arrangement direction of a magnetic south pole and a magnetic north pole of the magnetic steel 110. A side face on which a primary groove 111 on one magnetic steel 110 is located is disposed coplanar with a side face on which a primary groove 111 on the other magnetic steel 110 is located, and the primary groove 111 on the one magnetic steel 110 communicates with the primary groove 111 on the other magnetic steel 110. Each magnetic steel slot 121 may include a plurality of magnetic steels 110. A size of the magnetic steel 110 is reduced, to better reduce the eddy current loss of the magnetic steel 110. Primary grooves 111 on two adjacent magnetic steels 110 communicate with each other, to help dispose a groove on the magnetic steel 110.

In an embodiment, two magnetic steel slots 121 are axially symmetrical in a radial direction of the rotor 100, quantities of magnetic steels 110 in the two magnetic steel slots 121 are the same, quantities of, groove spacings between, and groove depths of a plurality of primary grooves 111 on the magnetic steels 110 in the two magnetic steel slots 121 are the same, and quantities of and groove spacings between a plurality of secondary grooves 112 on the magnetic steels 110 in the two magnetic steel slots 121 are the same. This setting enables processing and mounting of the magnetic steel 110 to be more convenient.

The embodiments further provide a magnetic steel 110 used for a radial flux motor 10. A cross-sectional shape of at least one magnetic steel 110 in a direction perpendicular to a length direction of the magnetic steel is a rectangle. At least one of side faces corresponding to two short edges of the rectangle includes a plurality of primary grooves 111. The plurality of primary grooves 111 are sequentially arranged at intervals in the length direction of the magnetic steel 110. At least one adjacent side face of the side face on which the plurality of primary grooves 111 are located includes a plurality of secondary grooves 112. The plurality of secondary grooves 112 are arranged at intervals in the length direction of the magnetic steel 110. At least one secondary groove 112 communicates with one primary groove 111.

In an embodiment, each of the side faces corresponding to the two short edges of the rectangle includes a plurality of primary grooves 111.

In an embodiment, an arrangement direction of the side faces corresponding to the two short edges of the rectangle intersects with an arrangement direction of a magnetic south pole and a magnetic north pole of the magnetic steel 110.

In an embodiment, in the length direction of the magnetic steel, a distance between any primary groove 111 and any end of the magnetic steel 110 is greater than or equal to ⅙ of a length of the magnetic steel 110.

In an embodiment, in the length direction of the magnetic steel, a distance between any primary groove 111 and any end of the magnetic steel 110 is greater than or equal to ⅜ of a length of the magnetic steel 110.

In an embodiment, a largest depth of the plurality of primary grooves 111 is greater than or equal to ¹/₁₀ of a width W of the magnetic steel 110 in a first direction X, and is less than or equal to ⅓ of the width of the magnetic steel 110 in the first direction X. The first direction X is the same as a depth Dg direction of the primary groove 111.

In an embodiment, a value of a spacing between two adjacent primary grooves 111 in the plurality of primary grooves 111 is greater than or equal to 0.5 millimeter, and is less than or equal to 500 millimeters.

In an embodiment, a value of a width Wg of the primary groove 111 in an axial direction A of a rotor 100 is greater than or equal to 0.01 millimeter, and is less than or equal to 1 millimeter.

In an embodiment, in the axial direction A of the rotor 100, depths of the plurality of primary grooves 111 are first increased and then decreased.

In an embodiment, the plurality of primary grooves 111 are distributed at equal intervals in an axial direction A of a rotor 100, and in the length direction of the magnetic steel 110, depths of the plurality of primary grooves 111 are first increased and then decreased.

In an embodiment, in the length direction of the magnetic steel 110, spacings between two adjacent primary grooves 111 in the plurality of primary grooves 111 are first decreased and then increased.

In an embodiment, depths of the plurality of primary grooves 111 are equal, and in an axial direction A of a rotor 100, spacings between two adjacent primary grooves 111 in the plurality of primary grooves 111 are first decreased and then increased.

In an embodiment, in the length direction of the magnetic steel 110, depths of the plurality of primary grooves 111 are first increased and then decreased, and spacings between two adjacent primary grooves 111 in the plurality of primary grooves 111 are first decreased and then increased.

The embodiments further provide a powertrain 2. The powertrain 2 includes a gearbox 21 and the radial flux motor 10 according to any one of the foregoing descriptions. The gearbox 21 includes a power input shaft 22. A motor shaft 200 of the radial flux motor 10 is connected to the power input shaft 22 through transmission, and is configured to transmit power to the power input shaft 22.

The embodiments further provide a vehicle 1. The vehicle 1 includes a frame 11 and the radial flux motor 10 according to any one of the foregoing descriptions, and the radial flux motor 10 is mounted on the frame 11. Alternatively, the vehicle 1 includes a frame 11 and the powertrain 2 described above, and the powertrain 2 is mounted on the frame 11.

The following describes in detail a case in which the magnetic steel 110 is used in different types of radial flux motors 10.

Refer to FIG. 4. In an embodiment, the rotor 100 in the radial flux motor 10 includes a plurality of magnetic steels 110. The plurality of magnetic steels 110 are disposed inside the rotor core 120 in a circumferential direction of the motor shaft 200. Two adjacent magnetic steels 110 are disposed in a "V" shape, and in the two adjacent magnetic steels 110, side faces on which a plurality of primary grooves are disposed are located at a tip of the "V" shape.

Two magnetic steels 110 that form a "V" shape whose opening faces away from the motor shaft 200 form a magnetic pole unit. In a same magnetic pole unit, magnetic poles located on an inner side of the "V" shape are the same, and are all S poles or N poles. A plurality of magnetic pole units are distributed in the circumferential direction C.

Magnetic poles on inner sides of "V" shapes of the plurality of magnetic pole units are alternately disposed as N poles and S poles.

Figure 24:
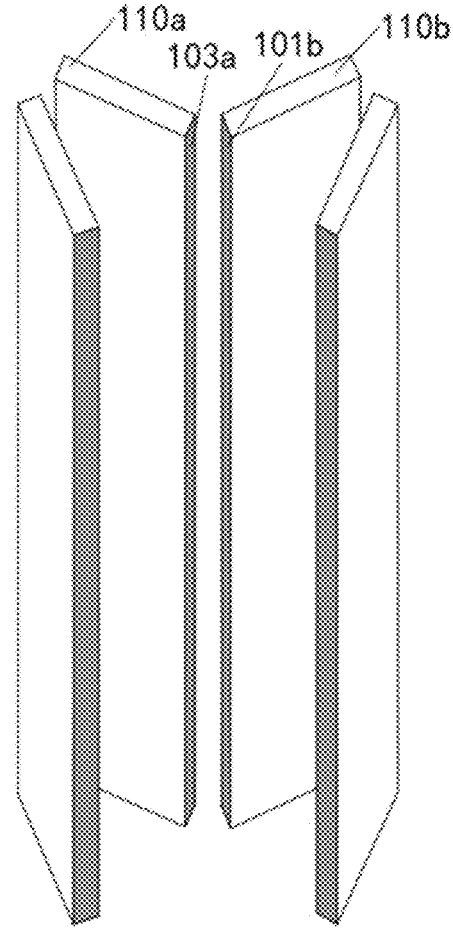
FIG. 24 is a schematic diagram of a magnetic steel according to an implementation.

As shown in FIG. 24, a magnetic steel 110a and a magnetic steel 110b are disposed in a "V" shape. An end face that is of the magnetic steel 110a and that is located at a tip of the "V" shape is a third side face 103a, and an end face that is of the magnetic steel 110b and that is located at the tip of the "V" shape is a first side face 101b. Each of the third side face 103a and the first side face 101b includes a plurality of primary grooves 111.

Figure 25:
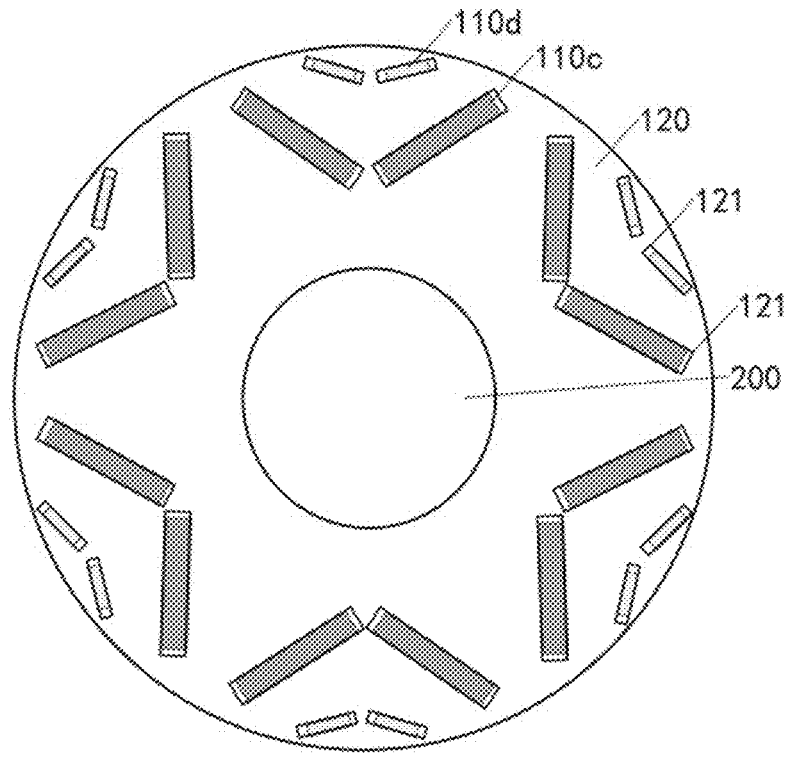
FIG. 25 is a schematic diagram of a rotor according to an implementation.

Refer to FIG. 25. In an implementation, an inner layer of magnetic steel and an outer layer of magnetic steel are disposed on the rotor 100 in the radial flux motor 10. The inner layer of magnetic steel is disposed closer to the motor shaft 200 than the outer layer of magnetic steel. The inner layer of magnetic steel includes a plurality of magnetic steels 110c disposed inside the rotor core 120 in the circumferential direction of the motor shaft 200. In the inner layer of magnetic steel, two adjacent magnetic steels 110c are disposed in a "V" shape, and in the two adjacent magnetic steels 110c, side faces on which at least one groove is disposed are located at a tip of the "V" shape.

The outer layer of magnetic steel also includes a plurality of magnetic steels 110d disposed inside the rotor core 120 in the circumferential direction of the motor shaft 200. In the outer layer of magnetic steel, two adjacent magnetic steels 110d are disposed in a "V" shape, and in the two adjacent magnetic steels 110d, side faces on which at least one groove is disposed are located at a tip of the "V" shape.

Refer to FIG. 3. In an implementation, a plurality of magnetic steels 110 are disposed on the rotor 100 in the radial flux motor 10. The plurality of magnetic steels 110 are disposed inside the rotor core 120 in a circumferential direction of the motor shaft 200. Two adjacent magnetic steels 110 are disposed in an "L" shape, and in the two adjacent magnetic steels 110, side faces on which at least one groove is disposed are located at an intersection point of the "L" shape. In this implementation, an S pole and an N pole of the magnetic steel 110 are arranged in a radial direction. Magnetic poles on a side that is of the plurality of magnetic steels 110 and that faces away from the motor shaft 200 in the radial direction are alternately disposed as N poles and S poles. Two adjacent magnetic steels 110 may vertically intersect, and an end face at an intersection point of an "L" shape includes a plurality of primary grooves 111.

In an implementation, at least some magnetic steel slots 121 in the plurality of magnetic steel slots 121 are distributed in a circumferential direction of the rotor 100, and are head-to-tail adjacent to each other (as shown in FIG. 3), at least some magnetic steels 110 in the plurality of magnetic steels 110 and the at least some magnetic steel slots 121 are disposed in a one-to-one correspondence, and in the circumferential direction of the rotor, all of a plurality of primary grooves 111 on any one of the at least some magnetic steels 110 face the at least some adjacent magnetic steel slots 121.

Figure 26:
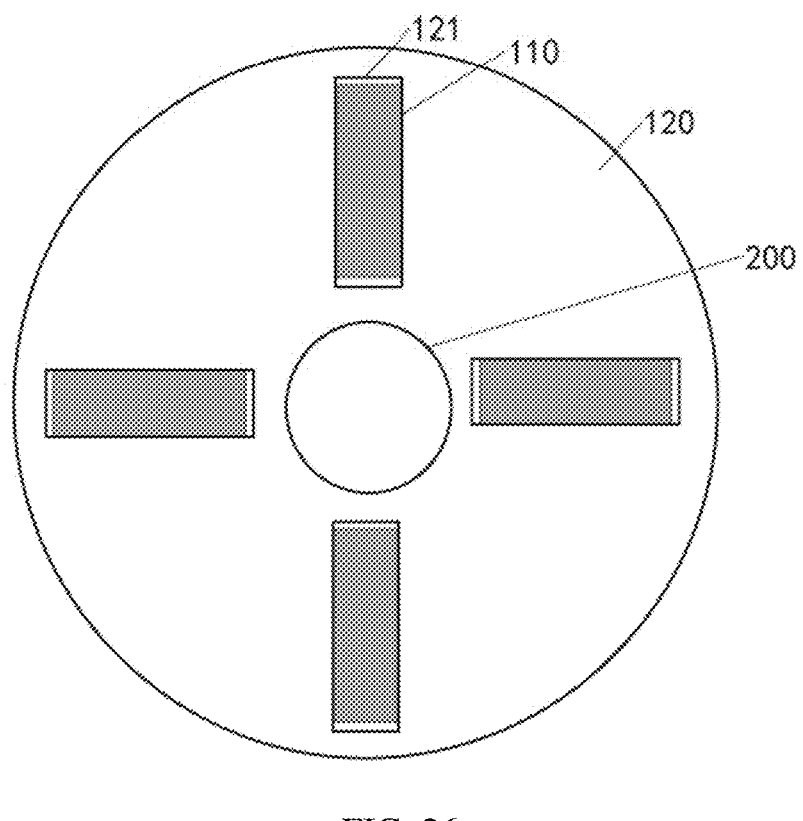
FIG. 26 is a schematic diagram of a rotor according to an implementation.

In an implementation, at least some magnetic steel slots 121 in the plurality of magnetic steel slots 121 are distributed in a radial architecture (as shown in FIG. 26), at least some magnetic steels 110 in the plurality of magnetic steels 110 and the at least some magnetic steel slots 121 are disposed in a one-to-one correspondence, and a plurality of primary grooves 111 on the at least some magnetic steels 110 face a center of the radial architecture. In FIG. 26, the center of the radial architecture is an axis of the motor shaft 200.

In an implementation, the magnetic steel 110 may be used in another type of radial flux motor 10.

The magnetic steel, the radial flux motor, the powertrain, and the vehicle provided in embodiments are described in detail above. The principle and embodiments are described using examples. The foregoing descriptions of embodiments are merely intended to help understand the method of the embodiments and the ideas thereof. In addition, a person of ordinary skill in the art may change specific embodiments and scope based on the concepts herein. Therefore, the content of the embodiments should not be understood as limiting.

What is claimed is:

1. A radial flux motor comprising:
a rotor comprising a plurality of magnetic steel slots and a plurality of magnetic steels; and
a motor shaft, wherein the rotor is sleeved on the motor shaft,
each magnetic steel slot of the plurality of magnetic steel slots penetrates through the rotor,
each magnetic steel slot is configured to accommodate one or more magnetic steels of the plurality of magnetic steels,
a surface of at least one magnetic steel that is spaced from a slot wall of the magnetic steel slot comprises a plurality of primary grooves,
at least one adjacent side face of a side face on which the plurality of primary grooves is located comprises a plurality of secondary grooves, and
the plurality of primary grooves is sequentially arranged at intervals in a length direction of the plurality of magnetic steels.

2. The radial flux motor according to claim 1, wherein a surface of each magnetic steel comprises a plurality of side faces, at least one of the plurality of side faces is spaced from the slot wall of each magnetic steel slot, and the at least one side face comprises the plurality of primary grooves.

3. The radial flux motor according to claim 1, wherein a cross-sectional shape of the at least one magnetic steel in a direction perpendicular to the length direction of each magnetic steel is a rectangle, side faces corresponding to two short edges of the rectangle are spaced from the slot wall of each magnetic steel slot, and the side faces corresponding to the two short edges of the rectangle comprise the plurality of primary grooves.

4. The radial flux motor according to claim 1, wherein included angles between extension directions of the plurality of primary grooves and the length direction of each magnetic steel comprise one or more angle values, and the one or more angle values comprise at least one of 90 degrees and a value less than 90 degrees.

5. The radial flux motor according to claim 1, wherein at least one of groove spacings between the plurality of primary grooves or groove depths of the plurality of primary grooves comprises at least two values, the groove spacing is a distance between two adjacent primary grooves, and the groove depth is a distance between a groove opening and a groove bottom of the plurality of primary grooves.

6. The radial flux motor according to claim 1, wherein, in the length direction of each magnetic the magnetic steel, a distance between any primary groove and any end of each magnetic steel is greater than or equal to ⅙ of a length of each magnetic the magnetic steel.

7. The radial flux motor according to claim 1, wherein a largest depth of the plurality of primary grooves is greater than or equal to ¹⁄₁₀ of a width of each magnetic steel in a depth direction of the plurality of primary grooves, and the largest depth of the plurality of primary grooves is less than or equal to ⅓ of the width of each magnetic steel in the depth direction of the plurality of primary grooves.

8. The radial flux motor according to claim 1, wherein, in the length direction of each magnetic steel, the depths of the plurality of primary grooves are first increased and then decreased; and/or in the length direction of each magnetic steel, spacings between two adjacent grooves in the plurality of primary grooves are first decreased and then increased.

9. The radial flux motor according to claim 1, wherein a value of a width of each primary groove in the length direction of each magnetic steel is greater than or equal to 0.01 millimeter, and is less than or equal to 1 millimeter.

10. The radial flux motor according to claim 1, wherein at least one secondary groove of the plurality of secondary grooves communicates with one primary groove of the plurality of primary grooves.

11. The radial flux motor according to claim 10, wherein at least one of groove spacings between the plurality of secondary grooves or groove depths of the plurality of secondary grooves comprises at least two values, the groove spacing between the plurality of secondary grooves is a distance between two adjacent secondary grooves of the plurality of secondary grooves, and the groove depth of the plurality of secondary grooves is a distance between a groove opening and a groove bottom of each secondary groove of the plurality of secondary grooves.

12. The radial flux motor according to claim 10, wherein an angle value of an included angle between an extension direction of one or more consecutive secondary grooves in the plurality of secondary grooves and the length direction of each magnetic steel is 90 degrees, and an angle value of an included angle between an extension direction of one or more other consecutive secondary grooves in the plurality of secondary grooves and the length direction of each magnetic steel is less than 90 degrees.

13. The radial flux motor according to claim 10, wherein two magnetic steel slots are axially symmetrical in a radial direction of the rotor, quantities of magnetic steels in the two magnetic steel slots are the same, quantities of a plurality of primary grooves on the magnetic steels in the two magnetic steel slots are the same, groove spacings between the plurality of primary grooves on the magnetic steels in the two magnetic steel slots are the same, and groove depths of the plurality of primary grooves on the magnetic steels in the two magnetic steel slots are the same, and quantities of a plurality of secondary grooves on the magnetic steels in the two magnetic steel slots and groove spacings between the plurality of secondary grooves on the magnetic steels in the two magnetic steel slots are the same.

14. The radial flux motor according to claim 1, wherein a surface of the at least one magnetic steel that is in contact with the slot wall of the magnetic steel slot comprises a plurality of secondary grooves, and the plurality of secondary grooves is sequentially arranged at intervals in the length direction of the at least one magnetic steel.

15. The radial flux motor according to claim 14, wherein each magnetic steel slot comprises a plurality of magnetic steels that is sequentially arranged adjacent to each other, and at least one primary groove on one of two adjacent magnetic steels communicates with at least one primary groove on the other magnetic steel.

16. A powertrain comprising:

a gearbox comprising a power input shaft; and a radial flux motor comprising:

a rotor comprising a plurality of magnetic steel slots and a plurality of magnetic steels; and a motor shaft, wherein the rotor is sleeved on the motor shaft, each magnetic steel slot of the plurality of magnetic steel slots penetrates through the rotor, each magnetic steel slot is configured to accommodate one or more magnetic steels of the plurality of magnetic steels, a surface of at least one magnetic steel that is spaced from a slot wall of the magnetic steel slot comprises a plurality of primary grooves, at least one adjacent side face of a side face on which the plurality of primary grooves is located comprises a plurality of secondary grooves, and the plurality of primary grooves is sequentially arranged at intervals in a length direction of the plurality of magnetic steels; and a motor shaft of the radial flux motor transmits power to the power input shaft.

17. The powertrain according to claim 16, wherein a surface of the magnetic steel comprises a plurality of side faces, at least one of the plurality of side faces is spaced from the slot wall of each magnetic steel slot, and the at least one side face comprises the plurality of primary grooves.

18. The powertrain according to claim 16, wherein a cross-sectional shape of the at least one magnetic steel in a direction perpendicular to the length direction of the at least one magnetic steel is a rectangle, side faces corresponding to two short edges of the rectangle are spaced from the slot wall of the magnetic steel slot, and the side faces corresponding to the two short edges of the rectangle comprise the plurality of primary grooves.

19. The powertrain according to claim 16, wherein included angles between extension directions of the plurality of primary grooves and the length direction of each magnetic steel comprise one or more angle values, and the one or more angle values comprise at least one of 90 degrees and a value less than 90 degrees.

20. A vehicle comprising:

a frame; and a powertrain comprising:

a gearbox comprising a power input shaft; and a radial flux motor comprising:

a rotor comprising a plurality of magnetic steel slots and a plurality of magnetic steels; and a motor shaft, wherein the rotor is sleeved on the motor shaft, each magnetic steel slot of the plurality of magnetic steel slots penetrates through the rotor, each magnetic steel slot is configured to accommodate one or more magnetic steels of the plurality of magnetic steels, a surface of at least one magnetic steel that is spaced from a slot wall of the magnetic steel slot comprises a plurality of primary grooves, at least one adjacent side face of a side face on which the plurality of primary grooves is located comprises a plurality of secondary grooves, and the plurality of primary grooves is sequentially arranged at intervals in a length direction of the plurality of magnetic steels;

a motor shaft of the radial flux motor transmits power to the power input shaft; and the powertrain is mounted on the frame, and a motor shaft of the radial flux motor drives the vehicle through the power input shaft.

\* \* \* \* \*